(12) United States Patent
Masuda et al.

(10) Patent No.: US 7,869,007 B2
(45) Date of Patent: Jan. 11, 2011

(54) RANGING APPARATUS AND RANGING METHOD

(75) Inventors: Tomonori Masuda, Itabashi-ku (JP); Youichi Sawachi, Kawaguchi (JP)

(73) Assignee: FUJIFILM Corporation, Tokyo (JP)

( * ) Notice: Subject to any disclaimer, the term of this patent is extended or adjusted under 35 U.S.C. 154(b) by 355 days.

(21) Appl. No.: 12/053,563

(22) Filed: Mar. 22, 2008

(65) Prior Publication Data

US 2008/0231831 A1    Sep. 25, 2008

(30) Foreign Application Priority Data

Mar. 23, 2007    (JP) ............... 2007-077861

(51) Int. Cl.
*G01C 3/08* (2006.01)
(52) U.S. Cl. .............. 356/5.1; 356/5.01; 356/5.11; 356/5.15
(58) Field of Classification Search ........ 356/3.01–28.5
See application file for complete search history.

(56) References Cited

U.S. PATENT DOCUMENTS 4,756,617 A * 7/1988 Cain et al. ............ 356/4.08
5,877,851 A * 3/1999 Stann et al. ........... 356/5.09

FOREIGN PATENT DOCUMENTS

JP    3758618 B2    2/2004

* cited by examiner

*Primary Examiner*—Thomas H Tarcza
*Assistant Examiner*—Luke D Ratcliffe
(74) *Attorney, Agent, or Firm*—Sughrue Mion, PLLC

(57) ABSTRACT

A first ranging apparatus includes a synchronizing signal generator for generating a synchronizing signal at a constant interval, a light-emitting unit for emitting an intensity-modulated light in response to the synchronizing signal input thereto, a light-detecting unit for detecting a reflected light from an object irradiated with the modulated light, in response to the synchronizing signal input thereto, a calculating unit for calculating the distance up to the object based on the phase difference between the modulated light and the reflected light, and a synchronizing signal control unit for changing an arrival time of the synchronizing signal from the synchronizing signal generator at the light-detecting unit, depending on the number of times that the synchronizing signal is generated. The light-detecting unit samples the amount of the reflected light in exposure periods established at a constant cycle length with reference to a time at which the synchronizing signal is input thereto.

22 Claims, 20 Drawing Sheets

STORED
ELECTRIC
CHARGE

STORED
ELECTRIC
CHARGE (TARNSFER ELECTRIC CHARGE)

(TARNSFER ELECTRIC CHARGE)

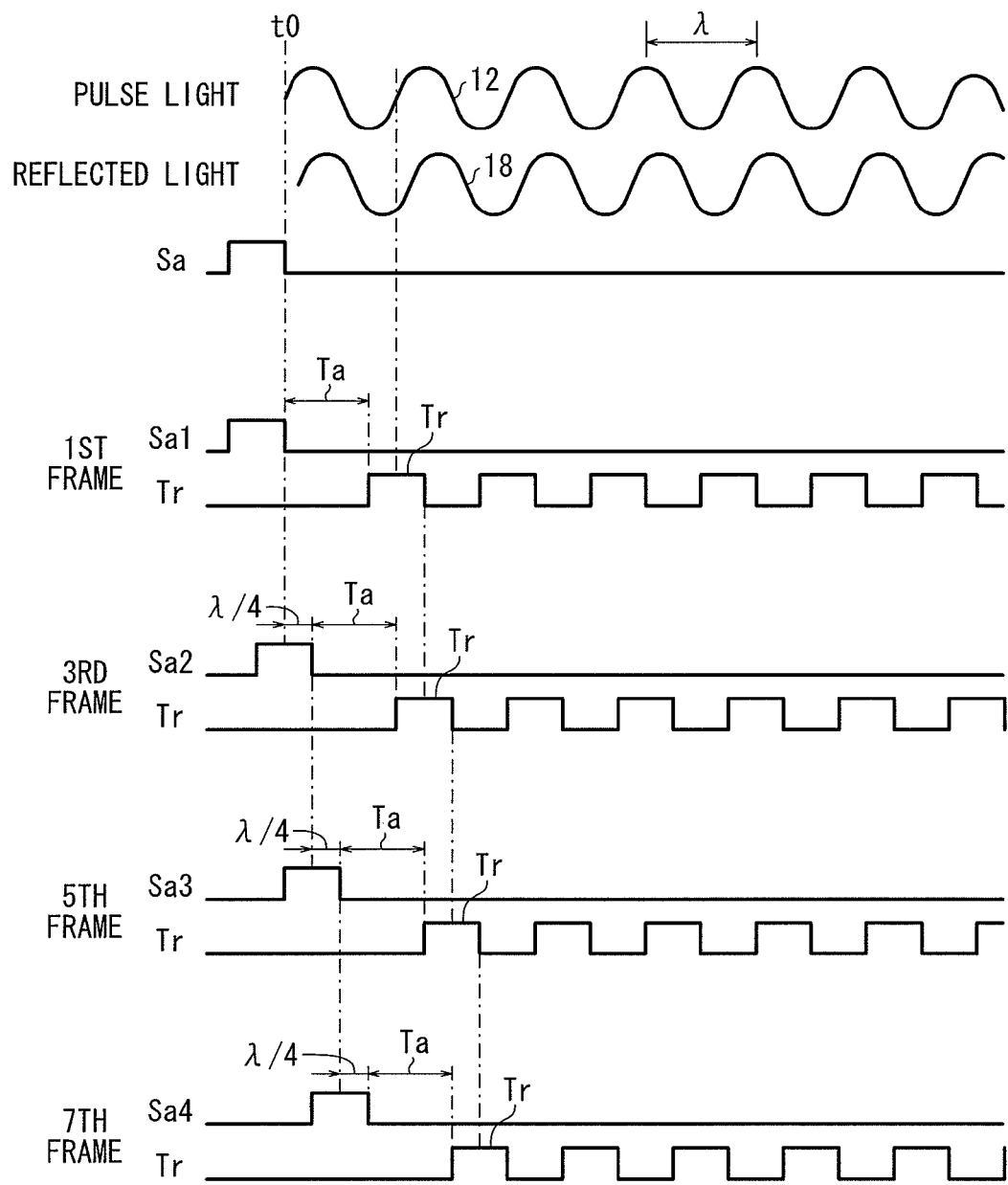

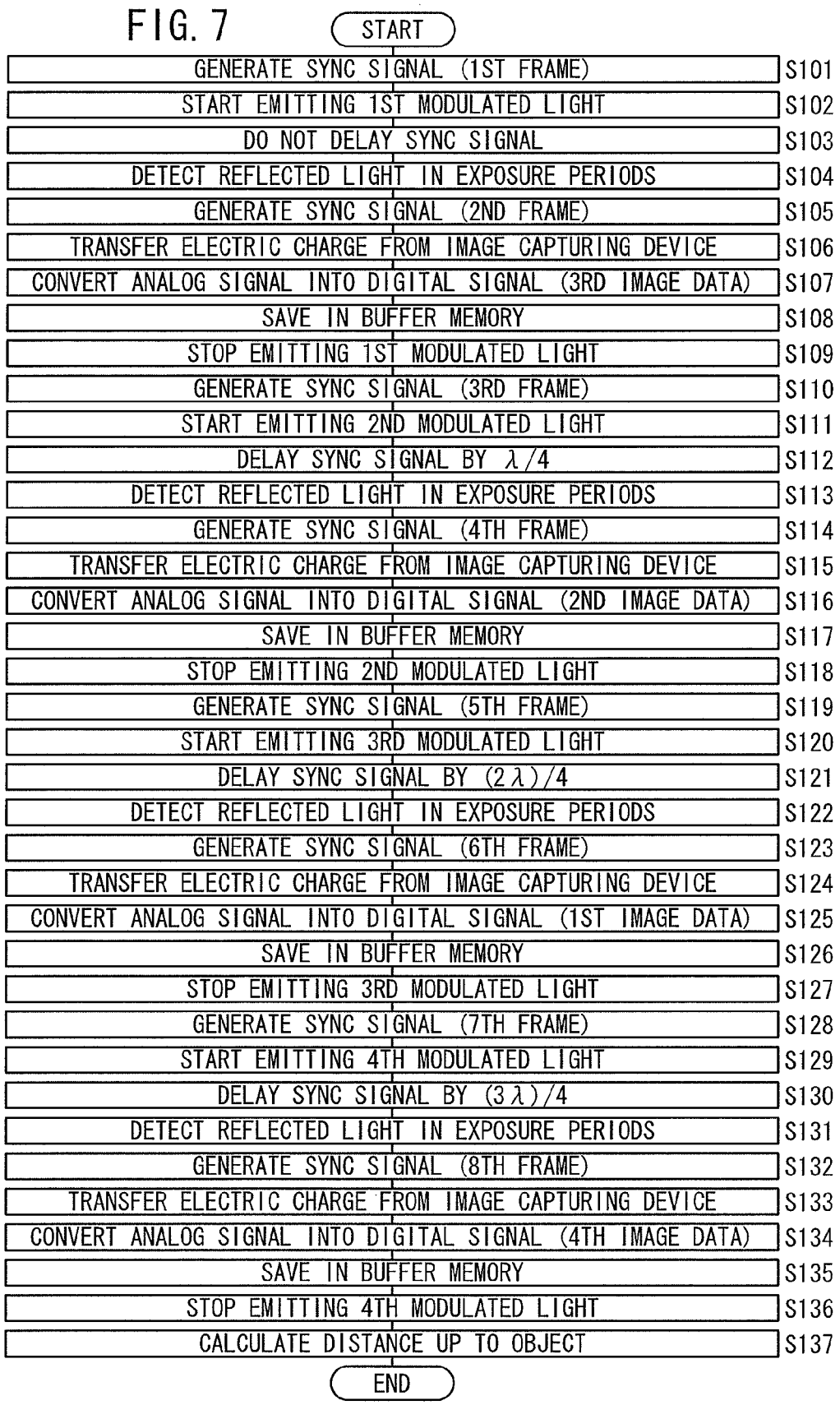

FIG. 7

- START
- GENERATE SYNC SIGNAL (1ST FRAME) — S101
- START EMITTING 1ST MODULATED LIGHT — S102
- DO NOT DELAY SYNC SIGNAL — S103
- DETECT REFLECTED LIGHT IN EXPOSURE PERIODS — S104
- GENERATE SYNC SIGNAL (2ND FRAME) — S105
- TRANSFER ELECTRIC CHARGE FROM IMAGE CAPTURING DEVICE — S106
- CONVERT ANALOG SIGNAL INTO DIGITAL SIGNAL (3RD IMAGE DATA) — S107
- SAVE IN BUFFER MEMORY — S108
- STOP EMITTING 1ST MODULATED LIGHT — S109
- GENERATE SYNC SIGNAL (3RD FRAME) — S110
- START EMITTING 2ND MODULATED LIGHT — S111
- DELAY SYNC SIGNAL BY $\lambda/4$ — S112
- DETECT REFLECTED LIGHT IN EXPOSURE PERIODS — S113
- GENERATE SYNC SIGNAL (4TH FRAME) — S114
- TRANSFER ELECTRIC CHARGE FROM IMAGE CAPTURING DEVICE — S115
- CONVERT ANALOG SIGNAL INTO DIGITAL SIGNAL (2ND IMAGE DATA) — S116
- SAVE IN BUFFER MEMORY — S117
- STOP EMITTING 2ND MODULATED LIGHT — S118
- GENERATE SYNC SIGNAL (5TH FRAME) — S119
- START EMITTING 3RD MODULATED LIGHT — S120
- DELAY SYNC SIGNAL BY $(2\lambda)/4$ — S121
- DETECT REFLECTED LIGHT IN EXPOSURE PERIODS — S122
- GENERATE SYNC SIGNAL (6TH FRAME) — S123
- TRANSFER ELECTRIC CHARGE FROM IMAGE CAPTURING DEVICE — S124
- CONVERT ANALOG SIGNAL INTO DIGITAL SIGNAL (1ST IMAGE DATA) — S125
- SAVE IN BUFFER MEMORY — S126
- STOP EMITTING 3RD MODULATED LIGHT — S127
- GENERATE SYNC SIGNAL (7TH FRAME) — S128
- START EMITTING 4TH MODULATED LIGHT — S129
- DELAY SYNC SIGNAL BY $(3\lambda)/4$ — S130
- DETECT REFLECTED LIGHT IN EXPOSURE PERIODS — S131
- GENERATE SYNC SIGNAL (8TH FRAME) — S132
- TRANSFER ELECTRIC CHARGE FROM IMAGE CAPTURING DEVICE — S133
- CONVERT ANALOG SIGNAL INTO DIGITAL SIGNAL (4TH IMAGE DATA) — S134
- SAVE IN BUFFER MEMORY — S135
- STOP EMITTING 4TH MODULATED LIGHT — S136
- CALCULATE DISTANCE UP TO OBJECT — S137
- END

FIG. 10

| IDENTIFICATION CODE | 1ST DELAY TIME |
|---|---|
| // | // |
| // | // |
| // | // |

| IDENTIFICATION CODE | WAVELENGTH | 2ND DELAY TIME | CORRECTIVE DELAY TIME |
|---|---|---|---|
| ″ | ″ | ″ | ″ |
| ″ | ″ | ″ | ″ |
| ″ | ″ | ″ | ″ |

RANGING APPARATUS AND RANGING METHOD

BACKGROUND OF THE INVENTION

1. Field of the Invention

The present invention relates to a ranging apparatus and a ranging method, and more particularly to a ranging apparatus and a ranging method for detecting the phase delay of reflected light from an object that is irradiated with modulated light at each of the pixels of an image capturing device, for thereby detecting a three-dimensional structure of the object.

2. Description of the Related Art

One known process for measuring the distance up to an object is an optical TOF (Time Of Flight) ranging process.

As shown in FIG. 17 of the accompanying drawings, a ranging apparatus based on the optical TOF ranging process comprises a light source 200 in the form of an LED array, for example, for emitting intensity-modulated light (modulated light), an image capturing device 204 for detecting reflected light from an object 202 irradiated with the modulated light from the light source 200, and an optical system 206 for focusing the reflected light onto the image capturing device 204.

If the modulated light emitted from the light source 200 and applied to the object 202 is intensity-modulated, for example, at a high frequency of 20 MHz, then the modulated light has a wavelength of 15 m. When the modulated light travels back and forth over a distance of 7.5 m, the modulated light which is detected by the image capturing device 204 has undergone a phase delay of one cycle length.

The phase delay that the reflected light undergoes with respect to the modulated light will be described below with reference to FIG. 18 of the accompanying drawings.

As shown in FIG. 18, a reflected light R has a phase delay of $\phi$ with respect to a modulated light W. In order to detect the phase delay of $\phi$, the reflected light R is sampled at four equal intervals, for example, in one cyclic period of the modulated light W. If the sampled amplitudes of the reflected light R at respective phases of 0°, 90°, 180°, 270°, for example, of the modulated light W are represented by A0, A1, A2, A3, respectively, then the phase delay of $\phi$ is expressed by the following equation:

$$\phi = \arctan\{(A3-A1)/(A0-A2)\}$$

The reflected light from the object 202 is focused onto the light-detecting surface of the image capturing device 204 by the optical system 206. The light-detecting surface of the image capturing device 204 comprises a two-dimensional matrix of pixels (photodiodes). When the phase delay of $\phi$ is determined at each of the pixels according to the above equation, a three-dimensional structure of the object 202 can be detected.

A ranging apparatus based on the above principle is disclosed in Japanese Patent No. 3758618, for example.

The disclosed ranging apparatus measures the distance from the apparatus to an object when reflected light from the object is detected in exposure periods established in a plurality of patterns by opening and closing the overflow drain gates (OFDG) or readout gates of an image capturing device out of phase with each other.

Specific details of the ranging process performed by the disclosed ranging apparatus will be described below with reference to FIGS. 19 and 20A through 20D of the accompanying drawings. In a first frame, in response to a negative-going edge of a synchronizing signal Sa (see FIG. 20A) in step S1 shown in FIG. 19, the light source 200 emits a modulated light W in step S2. When the object 202 is irradiated with the modulated light W, the object 202 reflects it as a reflected light R to the image capturing device 204. As shown in FIG. 20A, the image capturing device 204 is adjusted to have the center of a first exposure period Tr synchronized with a time point that is a time period T1 later than the negative-going edge of the synchronizing signal Sa, i.e., a time point at which the modulated light W has a phase of 0°. The image capturing device 204 is also adjusted such that each of successive exposure periods Tr thereof has a cycle length of $2\pi$.

In the first frame, the amount of reflected light R at the time the phase of the modulated light W is 0° is photoelectrically converted into an electric charge, which is stored in the image capturing device 204 in step S3. In a next second frame, the electric charge stored in the image capturing device 204 is transferred as an analog signal, and the analog signal is converted into a digital signal in step S4. The digital signal is saved in a buffer memory as a sampled amplitude A0 of the reflected light R at the time the phase of the modulated light W is 0° in step S5. Then, the light source 200 stops emitting the modulated light W in step S6.

Thereafter, in a next third frame, in response to a negative-going edge of the synchronizing signal Sa (see FIG. 20B) in step S7, the light source 200 emits the modulated light W again in step S8. When the object 202 is irradiated with the modulated light W, the object 202 reflects it as a reflected light R to the image capturing device 204. As shown in FIG. 20B, the image capturing device 204 is adjusted to have the center of a first exposure period Tr synchronized with a time point that is a time period T2 (>T1) later than the negative-going edge of the synchronizing signal Sa, i.e., a time point at which the modulated light W has a phase of 90°. The image capturing device 204 is also adjusted such that each of successive exposure periods Tr thereof has a cycle length of $2\pi$.

In the third frame, the amount of reflected light R at the time the phase of the modulated light W is 90° is photoelectrically converted into an electric charge, which is stored into the image capturing device 204 in step S9. In a next fourth frame, the electric charge stored in the image capturing device 204 is transferred as an analog signal, and the analog signal is converted into a digital signal in step S10. The digital signal is saved in a buffer memory as a sampled amplitude A1 of the reflected light R at the time the phase of the modulated light W is 90° in step S11. Then, the light source 200 stops emitting the modulated light W in step S12.

Thereafter, in a next fifth frame, in response to a negative-going edge of the synchronizing signal Sa (see FIG. 20C) in step S13, the light source 200 emits the modulated light W again in step S14. When the object 202 is irradiated with the modulated light W, the object 202 reflects it as a reflected light R to the image capturing device 204. As shown in FIG. 20C, the image capturing device 204 is adjusted to have the center of a first exposure period Tr synchronized with a time point that is a time period T3 (>T2) later than the negative-going edge of the synchronizing signal Sa, i.e., a time point at which the modulated light W has a phase of 180°. The image capturing device 204 is also adjusted such that each of successive exposure periods Tr thereof has a cycle length of $2\pi$.

In the fifth frame, the amount of reflected light R at the time the phase of the modulated light W is 180° is photoelectrically converted into an electric charge, which is stored into the image capturing device 204 in step S15. In a next fourth frame, the electric charge stored in the image capturing device 204 is transferred as an analog signal, and the analog signal is converted into a digital signal in step S16. The digital signal is saved in a buffer memory as a sampled amplitude A2 of the reflected light R at the time the phase of the modulated light W is 180° in step S17. Then, the light source 200 stops emitting the modulated light W in step S18.

Thereafter, in a next seventh frame, in response to a negative-going edge of the synchronizing signal Sa (see FIG. 20D) in step S19, the light source 200 emits the modulated light W again in step S20. When the object 202 is irradiated with the modulated light W, the object 202 reflects it as a reflected light R to the image capturing device 204. As shown in FIG. 20D, the image capturing device 204 is adjusted to have the center of a first exposure period Tr synchronized with a time point that is a time period T4 (>T3) later than the negative-going edge of the synchronizing signal Sa, i.e., a time point at which the modulated light W has a phase of 270°. The image capturing device 204 is also adjusted such that each of successive exposure periods Tr thereof has a cycle length of $2\pi$.

In the seventh frame, the amount of reflected light R at the time the phase of the modulated light W is 270° is photoelectrically converted into an electric charge, which is stored into the image capturing device 204 in step S21. In a next eighth frame, the electric charge stored in the image capturing device 204 is transferred as an analog signal, and the analog signal is converted into a digital signal in step S22. The digital signal is saved in a buffer memory as a sampled amplitude A3 of the reflected light R at the time the phase of the modulated light W is 270° in step S23. Then, the light source 200 stops emitting the modulated light W in step S24.

The phase delay $\phi$ of the reflected light R is determined based on the sampled amplitudes A0, A1, A2, A3 stored in the buffer memory, and the distance from the ranging apparatus to the object 202 is determined based on the phase delay $\phi$ in step S25.

The above ranging apparatus is problematic in that inasmuch as it is necessary for the different frames to have the different time periods T1 through T4 from the negative-going edge of the synchronizing signal Sa to the center of the first exposure period Tr, a complex drive circuit is required to operate the image capturing device 204, and the ranging process is burdensome for the CPU used therein.

SUMMARY OF THE INVENTION

It is an object of the present invention to provide a ranging apparatus and a ranging method which are capable of simplifying a drive circuit for operating an image capturing device, and are less burdensome for the CPU incorporated in the ranging apparatus.

According to a first aspect of the present invention, there is provided a ranging apparatus comprising a synchronizing signal generator for generating a synchronizing signal at a constant interval, a light-emitting unit for emitting a modulated light which is intensity-modulated, in response to the synchronizing signal input thereto, a light-detecting unit for detecting a reflected light from an object that is irradiated with the modulated light, in response to the synchronizing signal input thereto, a calculating unit for calculating the distance up to the object based on the phase difference between the modulated light and the reflected light, and a synchronizing signal control unit for changing an arrival time of the synchronizing signal from the synchronizing signal generator at the light-detecting unit, depending on the number of times that the synchronizing signal is generated.

With the above arrangement, it is not necessary to change the time period from the timing of the synchronizing signal input to the light-detecting unit to a light detection start time. Since a circuit for energizing an image capturing device used in the ranging apparatus is relatively simple, the ranging apparatus is less burdensome to a CPU incorporated therein.

According to the first aspect of the present invention, the light-detecting unit may sample the amount of the reflected light in exposure periods established at a constant cycle length with reference to a time at which the synchronizing signal is input thereto.

According to the first aspect of the present invention, the light-detecting unit may comprise an exposure period changer for changing time lengths of the exposure periods based on an external control signal, and the synchronizing signal control unit may change the arrival time of the synchronizing signal from the synchronizing signal generator at the light-detecting unit, based on the number of times that the synchronizing signal is generated and the changed time lengths of the exposure periods.

If the object and its background are so bright that the signal generated by the light-detecting unit is saturated, then the durations of the exposure periods may be changed by a user's command input, an automatic iris mechanism, or an electronic shutter combined with the image capturing device. In other words, the durations of the exposure periods may be changed based on an external control signal. In this case, the durations of the exposure periods are usually changed while the central points of the exposure periods remain unchanged in position. Therefore, the start times of the exposure periods are changed, and hence the timings at which the drive signal is applied to the image capturing device need to be changed, resulting in the need for a calibration.

However, the synchronizing signal control unit according to the first aspect of the present invention changes the arrival time of the synchronizing signal from the synchronizing signal generator at the light-detecting unit, based on the number of times that the synchronizing signal is generated and the changed time lengths of the exposure periods. Therefore, the centers of the exposure periods do not need to be changed in position even if the durations of the exposure periods are changed. Therefore, the ranging apparatus requires no calibration.

The ranging apparatus may further comprise a memory storing a table which registers therein information of light detection start timings corresponding to the changed time lengths of the exposure periods, and the synchronizing signal control unit may change the arrival time of the synchronizing signal from the synchronizing signal generator at the light-detecting unit, based on the number of times that the synchronizing signal is generated and the information registered in the table. Since the synchronizing signal control unit can change the arrival time of the synchronizing signal from the synchronizing signal generator at the light-detecting unit by referring to the table, the processing time of the ranging apparatus can be reduced.

The ranging apparatus may alternatively further comprise a timing calculator for calculating a light detection start timing based on the changed time lengths of the exposure periods, and the synchronizing signal control unit may change the arrival time of the synchronizing signal from the synchronizing signal generator at the light-detecting unit, based on the number of times that the synchronizing signal is generated and information of the light detection start timing calculated by the timing calculator. With this arrangement, the ranging apparatus does not need to have the memory or a memory area for storing the table.

According to the first aspect of the present invention, the light-detecting unit may include an exposure timing changer for changing the cycle length of the exposure periods based on an external control signal, the light-emitting unit may include a wavelength changer for changing the wavelength of the modulated light based on the cycle length of the exposure periods which has been changed by the exposure timing changer, and the synchronizing signal control unit may change the arrival time of the synchronizing signal from the synchronizing signal generator at the light-detecting unit, based on the number of times that the synchronizing signal is generated and the changed cycle length of the exposure periods.

If the distance up to the object is so large that the calculated distance is of an invalid value, then the wavelength of the modulated light may be changed by a CPU control signal or a user's command input. In other words, the wavelength of the modulated light may be changed based on an external control signal. In this case, the central time points of the exposure periods are usually determined depending on the changed wavelength of the modulated light. If the cycle length of the exposure periods is changed to a value which is related to the preset cycle length of the exposure periods by an integral number, e.g., if the cycle length of the exposure periods is divided by an integer or multiplied by an integer, then the process is simple. However, if the cycle length of the exposure periods is changed to a value which is related to the preset cycle time of the exposure periods by a real number, then the ranging apparatus needs a dedicated calibration.

According to the first aspect of the present invention, however, the wavelength changer changes the wavelengths of plural modulated lights based on the external control signal, the exposure timing changer changes the cycle length of the exposure periods based on the external control signal, and the synchronizing signal control unit changes the arrival time of the synchronizing signal from the synchronizing signal generator at the light-detecting unit based on the number of times that the synchronizing signal is generated and the changed cycle length of the exposure periods. Consequently, the wavelength of the modulated light can be set to match the cycle length of the exposure periods. As a result, the exposure timing can be changed to a value which is related to the preset cycle length of the exposure periods by an integral number, e.g., the cycle length of the exposure periods can be divided by an integer or multiplied by an integer. Accordingly, the circuit arrangement of the ranging apparatus is relatively simple.

The ranging apparatus may further comprise a memory storing a table which registers therein information of the wavelength of the modulated light which corresponds to the changed cycle length of the exposure periods, and information of light detection start timings, the wavelength changer may change the wavelength of the modulated light based on the information registered in the table, and the synchronizing signal control unit may change the arrival time of the synchronizing signal from the synchronizing signal generator at the light-detecting unit, based on the number of times that the synchronizing signal is generated and the information registered in the table stored in the memory.

The wavelength changer can change the wavelengths of plural modulated lights based on the changed cycle length of the exposure periods by referring to the table, and the synchronizing signal control unit can change the arrival time of the synchronizing signal from the synchronizing signal generator at the light-detecting unit by referring to the table. Therefore, the processing time of the ranging apparatus can be reduced.

The ranging apparatus may alternatively further comprise a wavelength calculator for calculating a wavelength of the modulated light based on the changed cycle length of the exposure periods, and a timing calculator for calculating a light detection start timing based on the changed cycle length of the exposure periods. The wavelength changer may change the wavelength of the modulated light to the wavelength calculated by the wavelength calculator, and the synchronizing signal control unit may change the arrival time of the synchronizing signal from the synchronizing signal generator at the light-detecting unit, based on the number of times that the synchronizing signal is generated and the light detection start timing calculated by the timing calculator. With this arrangement, the ranging apparatus does not need to have the memory or a memory area for storing the table.

According to the first aspect of the present invention, the light-emitting unit may emit a first modulated light over a predetermined period from a first emission start time based on the synchronizing signal input from the synchronizing signal generator, and emit a second modulated light over the predetermined period from a second emission start time based on the synchronizing signal input from the synchronizing signal generator, the light-detecting unit may detect a first reflected light from the object irradiated with the first modulated light over the predetermined period from the synchronizing signal input thereto which is output from the synchronizing signal control unit based on the first emission start time, and detect a second reflected light from the object irradiated with the second modulated light over the predetermined period from the synchronizing signal input thereto which is output from the synchronizing signal control unit based on the second emission start time, and the calculating unit may calculate the distance up to the object based on at least the phase difference between the first modulated light and the first reflected light and the phase difference between the second modulated light and the second reflected light.

The light-detecting unit may sample the amount of the first reflected light in exposure periods established at a constant cycle length with reference to the synchronizing signal input thereto which is output from the synchronizing signal control unit based on the first emission start time, and sample the amount of the second reflected light in exposure periods established at the constant cycle length with reference to the synchronizing signal input thereto which is output from the synchronizing signal control unit based on the second emission start time, and the calculating unit may calculate a value representing the sampled amount of the first reflected light which is integrated over the predetermined period, as the phase difference between the first modulated light and the first reflected light, and calculate a value representing the sampled amount of the second reflected light which is integrated over the predetermined period, as the phase difference between the second modulated light and the second reflected light.

According to the first aspect of the present invention, the ranging apparatus may further comprise a light detection start corrector for correcting the arrival time of the synchronizing signal from the synchronizing signal generator at the light-detecting unit, based on the difference between the distance up to the object which is calculated by the calculating unit and a distance measured up to the object. Since the ranging apparatus can correct an error of the distance measured up to the object, the ranging apparatus can measure the distance accurately and stably.

According to a second aspect of the present invention, there is provided a ranging method comprising the steps of (a) generating a synchronizing signal at a constant interval, (b) emitting a modulated light which is intensity-modulated in response to the synchronizing signal which is input, (c) delaying the generated synchronizing signal based on the number of times that the synchronizing signal is generated, (d) detecting a reflected light from an object that is irradiated with the modulated light, in response to the synchronizing signal which is input, and (e) calculating the distance up to the object based on the phase difference between the modulated light and the reflected light.

With the above arrangement, it is not necessary to change the time period from the timing of the synchronizing signal input to the light-detecting unit to a light detection start time. Since a circuit for energizing an image capturing device used in the ranging method is relatively simple, the ranging method is less burdensome to a CPU used for carrying out the method.

According to the second aspect of the present invention, the step (d) may comprise the step of sampling the amount of the reflected light in exposure periods established at a constant cycle length with reference to a time at which the synchronizing signal is input.

According to the second aspect of the present invention, the step (d) may comprise the step of changing time lengths of the exposure periods based on an external control signal, and the step (c) may comprise the step of delaying the generated synchronizing signal based on the number of times that the synchronizing signal is generated and the changed time lengths of the exposure periods. The method may use a table registering therein information of light detection start timings corresponding to the changed time lengths of the exposure periods, and the step (c) may comprise the step of delaying the generated synchronizing signal based on the number of times that the synchronizing signal is generated and the information registered in the table. Alternatively, the ranging method may further comprise the step of calculating a light detection start timing based on the changed time lengths of the exposure periods, and the step (c) may comprise the step of delaying the generated synchronizing signal based on the number of times that the synchronizing signal is generated and information of the calculated light detection start timing.

According to the second aspect of the present invention, the step (d) may comprise the step of changing the cycle length of the exposure periods based on an external control signal, the step (b) may comprise the step of changing the wavelength of the modulated light based on the cycle length of the exposure periods which has been changed in the step of changing the cycle length, and the step (c) may comprise the step of delaying the generated synchronizing signal based on the number of times that the synchronizing signal is generated and the changed cycle length of the exposure periods. The ranging method may use a table registering therein information of the wavelength of the modulated light which corresponds to the changed cycle length of the exposure periods, and information of light detection start timings is used, the step of changing the wavelength may comprise the step of changing the wavelength of the modulated light based on the information registered in the table, and the step (c) may comprise the step of delaying the generated synchronizing signal based on the number of times that the synchronizing signal is generated and the information registered in the table. Alternatively, the ranging method may further comprise the steps of calculating a wavelength of the modulated light based on the changed cycle length of the exposure periods, and calculating a light detection start timing based on the changed cycle length of the exposure periods, the step of changing the wavelength may comprise the step of changing the wavelength of the modulated light to the wavelength calculated in the step of calculating a wavelength, and the step (c) may comprise the step of delaying the generated synchronizing signal based on the number of times that the synchronizing signal is generated and the light detection start timing calculated in the step of calculating a light detection start timing.

According to the second aspect of the present invention, the step (b) may comprise the steps of emitting a first modulated light over a predetermined period from a first emission start time based on the generated synchronizing signal which is input, and emitting a second modulated light over a predetermined period from a second emission start time based on the generated synchronizing signal which is input, the step (d) may comprise the steps of detecting a first reflected light from the object irradiated with the first modulated light over the predetermined period from the synchronizing signal input thereto which is output from the step (c) based on the first emission start time, and detecting a second reflected light from the object irradiated with the second modulated light over the predetermined period from the synchronizing signal input thereto which is output from the step (c) based on the second emission start time, and the step (e) may comprise the step of calculating the distance up to the object based on at least the phase difference between the first modulated light and the first reflected light and the phase difference between the second modulated light and the second reflected light.

The step (d) may comprise the steps of sampling the amount of the first reflected light in exposure periods established at a constant cycle length with reference to the synchronizing signal input thereto which is output from the step (c) based on the first emission start time, and sampling the amount of the second reflected light in exposure periods established at the constant cycle length with reference to the synchronizing signal input thereto which is output from the step (c) based on the second emission start time, and the step (e) may comprise the steps of calculating a value representing the sampled amount of the first reflected light which is integrated over the predetermined period, as the phase difference between the first modulated light and the first reflected light, and calculating a value representing the sampled amount of the second reflected light which is integrated over the predetermined period, as the phase difference between the second modulated light and the second reflected light.

According to the second aspect of the present invention, the ranging method may further comprise the step of correcting a delay time for delaying the synchronizing signal in the step (c) based on the difference between the distance up to the object which is calculated in the step (e) and a distance measured up to the object.

As described above, with the ranging apparatus and the ranging method according to the present invention, since the circuit for energizing the image capturing device used in the ranging apparatus and the ranging method is relatively simple, the ranging apparatus and the ranging method is less burdensome to the CPU used therein.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a waveform diagram showing the relationship between a modulated light emitted from a light-emitting unit, a synchronizing signal, and exposure periods;

FIG. 7 is a flowchart of a processing sequence of the first ranging apparatus;

Figure 10:
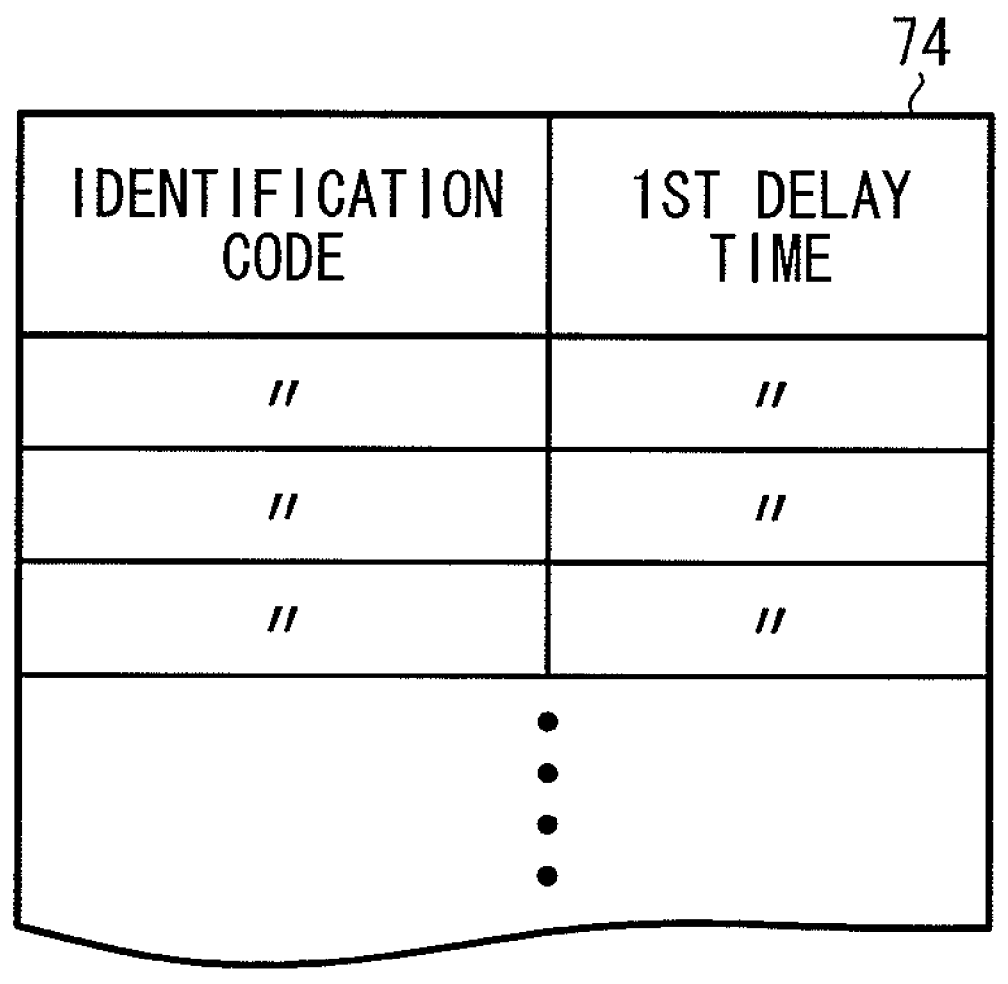

FIG. 10 is a diagram showing details of a first information table;

FIG. 14 is a diagram showing details of a second information table;

DESCRIPTION OF THE PREFERRED EMBODIMENTS

Figure 1:
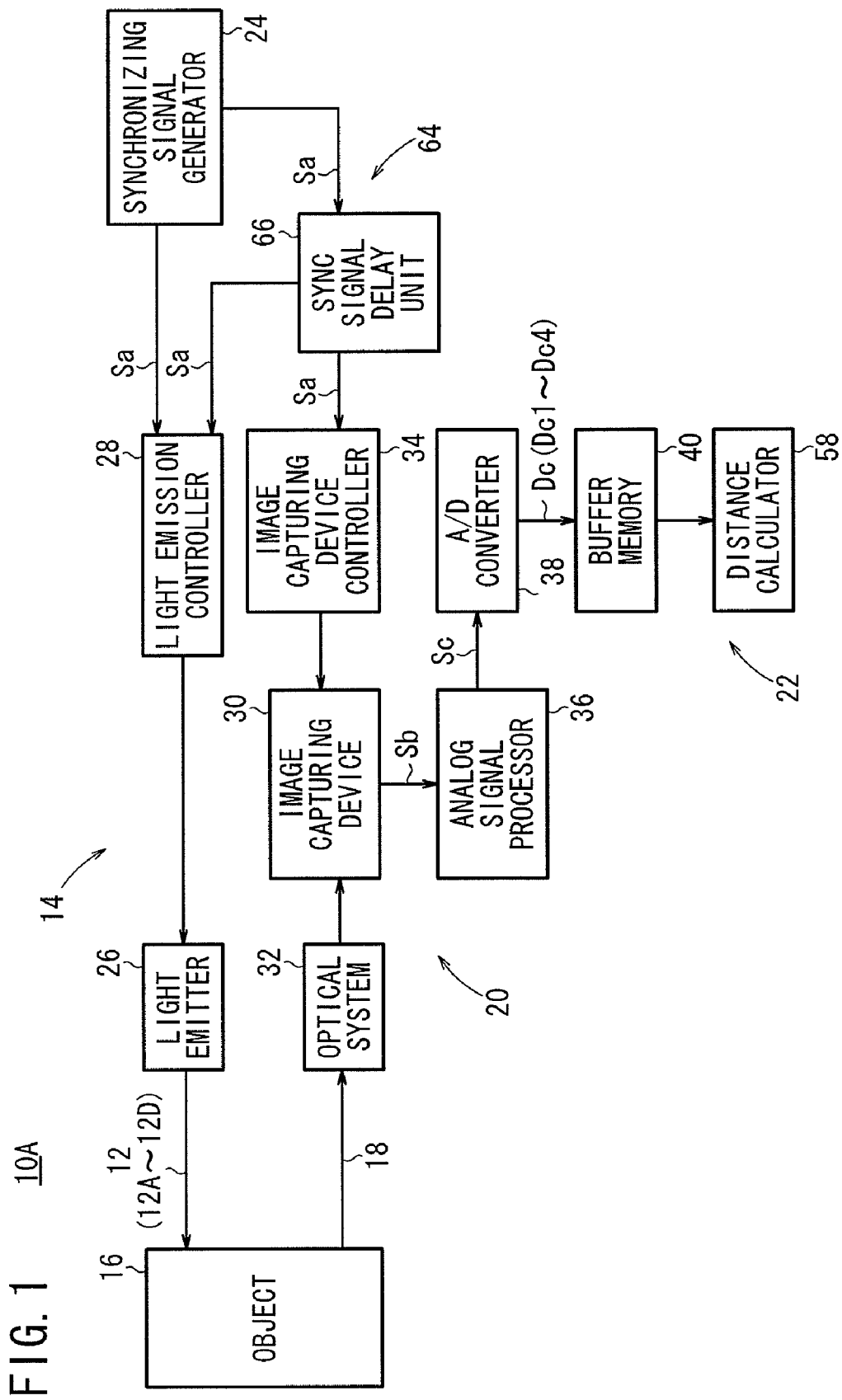
FIG. 1 is a block diagram of a first ranging apparatus according to the present invention.

Like or corresponding parts are denoted by like or corresponding reference characters.

Ranging apparatus and ranging methods according to preferred embodiments of the present invention will be described below with reference to FIGS. 1 through 16.

As shown in FIG. 1, a ranging apparatus 10A according to a first embodiment of the present invention (hereinafter referred to as "first ranging apparatus 10A") comprises a light-emitting unit 14 for emitting a modulated light 12 which has been intensity-modulated, a light-detecting unit 20 for detecting a reflected light 18 from an object 16 which has been irradiated with the modulated light 12, a calculating unit 22 for calculating the distance from the first ranging apparatus 10A to the object 16 based on the phase difference between the modulated light 12 and the reflected light 18, and a synchronizing signal generator 24 for generating a synchronizing signal Sa which represents the start of a light emission process.

The light-emitting unit 14 comprises a light emitter 26 and a light emission controller 28 for controlling the light emitter 26 to intensity-modulate a light emitted from the light emitter 26 and emit it as the modulated light 12. The light emitter 26 starts emitting the modulated light 12 at a reference time t0, which is aligned with a negative-going-edge time t0, for example, of the synchronizing signal Sa.

The light emitter 26 comprises an array of LEDs. The light emission controller 28 controls the light emitter 26 to emit a light that is intensity-modulated sinusoidally, for example, as the modulated light 12, based on the synchronizing signal S1 input from the synchronizing signal generator 24.

The light-detecting unit 20 comprises an image capturing device 30, an optical system 32 for focusing the reflected light 18 onto the light-detecting surface of the image capturing device 30, an image capturing device controller 34 for energizing the image capturing device 30, an analog signal processor 36 for processing a captured image signal Sb from the image capturing device 30 into an analog image signal Sc, an A/D converter 38 for converting the analog image signal Sc into digital image data Dc, and a buffer memory 40 for storing the digital image data Dc therein.

Figure 2:
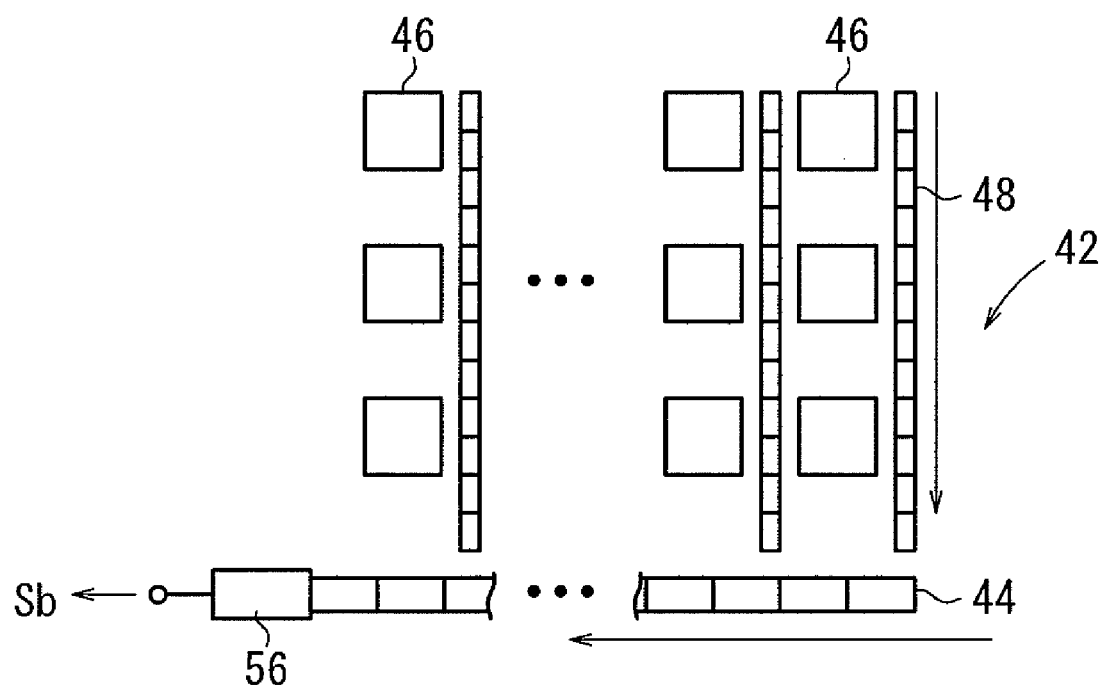
FIG. 2 is a schematic view of a general structure of an image capturing device.

As shown in FIG. 2, the image capturing device 30 comprises a light detector 42 and a horizontal transfer path 44 disposed adjacent to the light detector 42. The light detector 42 comprises a matrix of pixels 46 (photodiodes) for photoelectrically converting an amount of light applied thereto into an amount of electric charge corresponding to the applied amount of light. The image capturing device 30 also includes a plurality of vertical transfer paths 48 that are shared by respective columns of pixels 46 and spaced apart along rows of pixels 46. The horizontal transfer path 44 is shared by the vertical transfer paths 48.

Figure 3A:
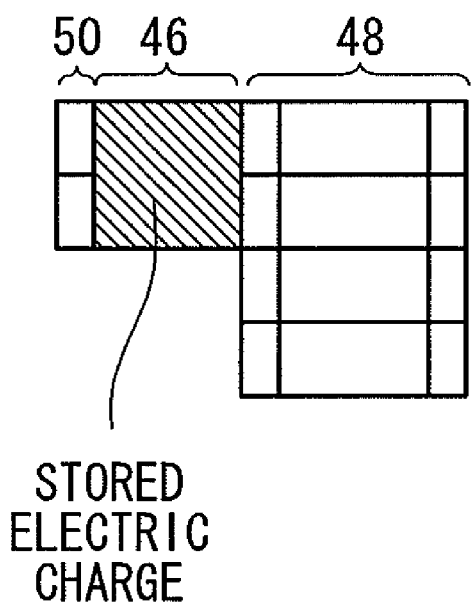
FIGS. 3A and 3B are views showing how an electric charge is stored in the image capturing device.
Figure 3B:
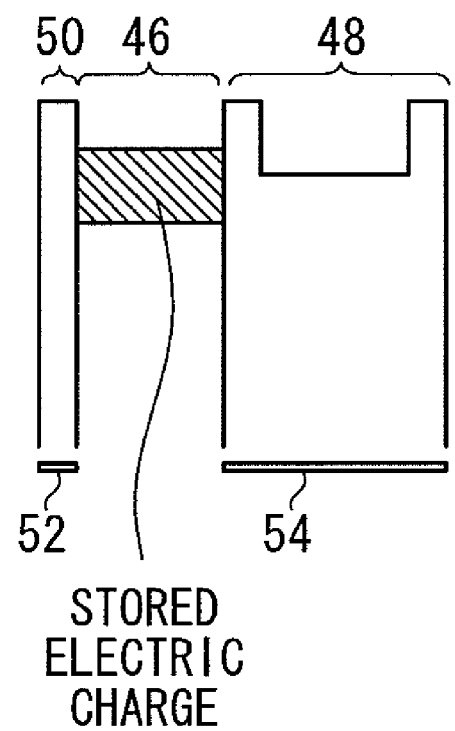

A process of reading electric charges from the pixels 46 based on the concept of frames used in the outputting of video data will be described below. As shown in FIGS. 3A and 3B, each of the pixels 46 generates an electric charge in response to a reflected light 18 applied thereto and stores the generated electric charge (exposure) in a first frame. At this time, the pixel 46 is not exposed to the reflected light 18 throughout the first frame, but is exposed to the reflected light 18 in each of exposure periods that are established at required timings. Specifically, the exposure periods are established by energizing an electrooptical shutter or a CCD electronic shutter combined with the image capturing device 30 based on a control signal from the image capturing device controller 34. An overflow drain region 50 is disposed adjacent to each of the pixels 46. When a predetermined voltage is applied to a drain electrode 52 connected to the overflow drain region 50, the potential of the overflow drain region 50 is lowered to drain the electric charge stored in the pixel 46.

Figure 4A:
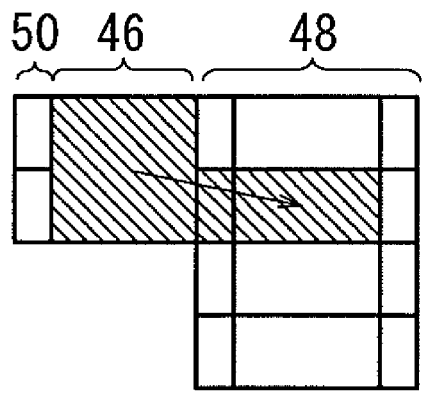
FIGS. 4A and 4B are views showing how an electric charge is transferred in the image capturing device.
Figure 4B:
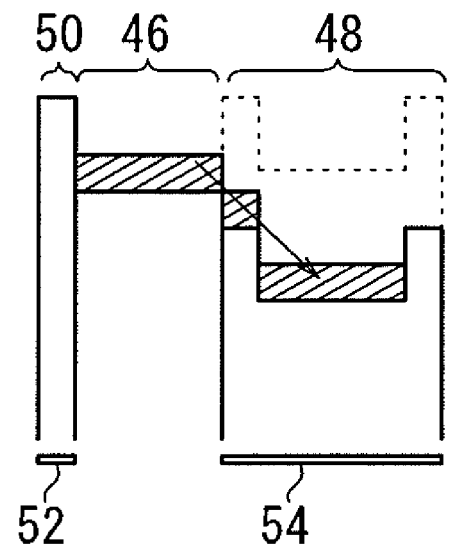

In a next second frame, the electric charge is transferred. Specifically, during a vertical blanking period, for example, of the second frame, as shown in FIGS. 4A and 4B, a predetermined voltage is applied to a vertical transfer electrode 54 corresponding to one packet of the vertical transfer path 48, thereby lowering the potential of the packet to a level lower than the potential of the pixel 46. The electric charge stored in the pixel 46 now flows into the vertical transfer path 48. Thereafter, the potential is restored, and during a horizontal blanking period, a transfer voltage is applied to the vertical transfer electrode 54 to transfer the electric charge to the horizontal transfer path 44, as shown in FIG. 2. When the electric charge is transferred to the horizontal transfer path 44, a transfer voltage is applied to a horizontal transfer electrode connected to the horizontal transfer path 44 during a horizontal scanning period, thereby transferring the electric charge along the horizontal transfer path 44 to an output circuit 56. The output circuit 56 converts the electric charge into a voltage signal depending on the amount of electric charge, and outputs the voltage signal as the captured image signal Sb.

The horizontal blanking period and the horizontal scanning period in the second frame are repeated to transfer a series of electric charges stored in the respective pixels 46 along the vertical transfer path 48 and the horizontal transfer path 44 to the output circuit 56, which outputs the captured image signal Sb.

In the second frame, the pixels 46 may be or may not be exposed to the reflected light 18.

The captured image signal Sb from the image capturing device 30 is processed into the analog image signal Sc by the analog signal processor 36. The analog image signal Sc is converted into the digital image data Dc by the A/D converter 38. The digital image data Dc have a data structure comprising an array of amplitudes of the reflected light 18 that are sampled at required timings (exposure periods) and associated with the respective pixels 46.

The buffer memory 40 stores four types of image data Dc (first through fourth image data Dc1 through Dc4) according to the optical TOF ranging process referred to above. The first image data Dc1 has a data structure comprising an array of amplitudes of the reflected light 18 that are sampled at timings when the phase of the modulated light 12 is 0°, for example, and associated with the respective pixels 46. Similarly, the second, third, and fourth image data Dc2, Dc3, Dc4 have a data structure comprising an array of amplitudes of the reflected light 18 that are sampled at timings when the phase of the modulated light 12 is 90°, 180°, 270°, for example, and associated with the respective pixels 46.

The calculating unit 22 comprises a distance calculator 58 for calculating the distances from the respective pixels 46 to the object 16 based on the first through fourth image data Dc1 through Dc4.

A calculating algorithm of the distance calculator 58, particularly, a calculating algorithm for calculating the distance from one pixel 46 to the object 16 will be described below with reference to FIG. 5. If it is assumed that the modulated light 12 has its varying amplitude represented by a circle 60 with its center at the origin of a coordinate system, then the reflected light 18 has its amplitude at points P1, P2, P3, P4 when the modulated light 12 is at respective phases of 0° (360°), 90°, 180°, 270°. If the point P1 has coordinates (A, −B), then the point P2 has coordinates (B, A), the point P3 has coordinates (−A, B), and the point P4 has coordinates (−B, −A).

Figure 5:
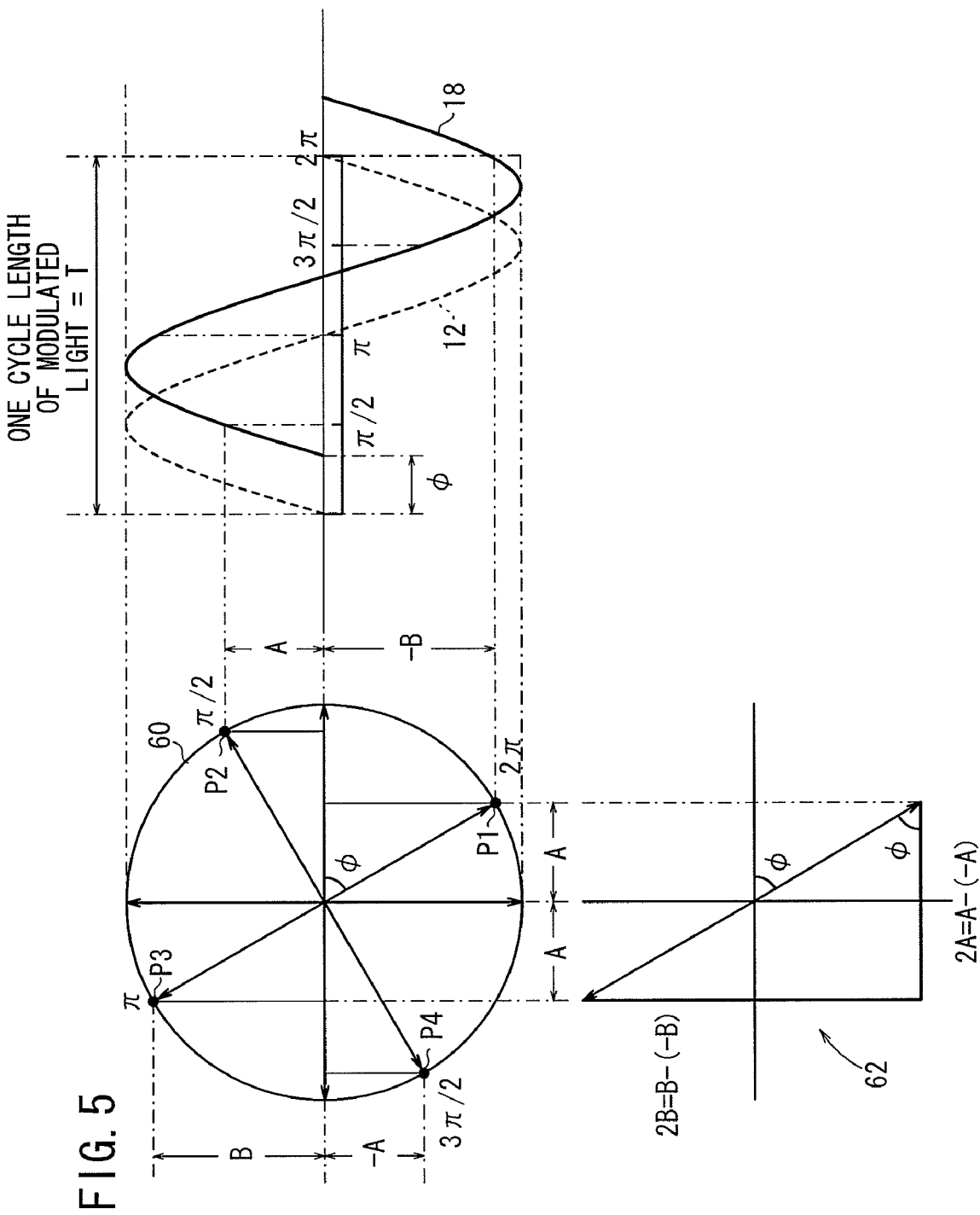
FIG. 5 is a diagram illustrative of the principle of a process for determining a phase delay of a reflected light from sampled amplitudes thereof based on a captured image signal from the image capturing device.

Since these coordinates can be converted into a rectangular triangle 62 shown in FIG. 5, the phase delay φ of the reflected light 18 with respect to the modulated light 12 is determined by the following equation (1):

$$\phi = \arctan\{(B-(-B))/(A-(-A))\} \quad (1)$$

Since A corresponds to the sampled amplitude S2 of the second image data Dc2, −A the sampled amplitude S4 of the fourth image data Dc4, B the sampled amplitude S3 of the third image data Dc3, and −B the sampled amplitude S1 of the first image data Dc1, the equation (1) can be rewritten into the following equation (2):

$$\phi = \arctan\{(S3-S1)/(S2-S4)\} \quad (2)$$

If one cycle length of the modulated light 12 is indicated by T, then a delay time τ that is consumed after the modulated light 12 is emitted from the light emitter 26 until the reflected light 18 is detected by the image capturing device 30 is determined by the following equation:

$$\tau = T \times (\phi/2\pi)$$

The delay time τ is commensurate with twice the distance L from the first ranging apparatus 10A to the object 16 and the light travels between the ranging apparatus 10A and the object 16. Therefore, the distance L is determined by the equation:

$$L = (\tau \times c)/2$$

The distance calculator 58 has the above algorithm installed as software, and applies the algorithm to each of the pixels 46 to calculate the distance depending on each of the pixels 46 for thereby detecting the three-dimensional structure of the object 16.

The light detecting unit 20 of the first ranging apparatus 10A includes a synchronizing signal control unit 64 for changing the arrival time of the synchronizing signal Sa from the synchronizing signal generator 24 at the image capturing device controller 34. Particularly, the synchronizing signal control unit 64 comprises a synchronizing signal delay unit 66 for delaying the arrival time of the synchronizing signal Sa at the image capturing device controller 34 depending on the number of times that the synchronizing signal Sa is generated.

The image capturing device controller 34 controls the image capturing device 30 to sample the amount of reflected light 18 in exposure periods that are established at fixed intervals from a negative-going edge, for example, of the synchronizing signal Sa that is input to the image capturing device controller 34.

Specifically, as shown in FIG. 6, the image capturing device controller 34 starts a first exposure period Tr at a time point when a given period Ta has elapsed from a negative-going edge, for example, of the synchronizing signal Sa, and controls the image capturing device 30 to obtain a sampled amplitude of the reflected light 18 at either one of the phases of 0°, 90°, 180°, 270° of the modulated light 12 by equalizing the cycle length of the exposure periods Tr to one wavelength of the modulated light 12. In this case, the synchronizing signal delay unit 66 delays the arrival time of the synchronizing signal Sa at the image capturing device controller 34 by λ/4 depending on the number of times that the synchronizing signal Sa is generated, for thereby obtaining sampled amplitudes of the reflected light 18 at the respective phases of 0°, 90°, 180°, 270° of the modulated light 12.

More specifically, the chronological relation between the modulated light 12 and the exposure periods Tr will be described below with reference to FIG. 6. In an initial state (when the synchronizing signal Sa is not delayed, see a synchronizing signal Sa1), the centers of the exposure periods Tr are held in alignment with the phase of 0° of the modulated light 12. When the synchronizing signal Sa is delayed by λ/4 (see a synchronizing signal Sa2), the centers of the exposure periods Tr are held in alignment with the phase of 90° of the modulated light 12. Similarly, when the synchronizing signal Sa is delayed by (2λ)/4 (see a synchronizing signal Sa3), the centers of the exposure periods Tr are held in alignment with the phase of 180° of the modulated light 12, and when the synchronizing signal Sa is delayed by (3λ)/4 (see a synchronizing signal Sa4), the centers of the exposure periods Tr are held in alignment with the phase of 270° of the modulated light 12.

It is assumed that in the initial state, the image capturing device controller 34 starts the exposure period Tr starts at a time point when a given period Ta has elapsed from a negative-going-edge time t0 of the synchronizing signal Sa, and controls the image capturing device 30 to obtain a sampled amplitude S1 of the reflected light 18 at the phase of 0° of the modulated light 12. When the synchronizing signal delay unit 66 delays the time required for the synchronizing signal Sa to arrive at the image capturing device controller 34 by a time corresponding to $\lambda/4$, the image capturing device 30 obtains a sampled amplitude S2 of the reflected light 18 at the phase of 90° of the modulated light 12. When the synchronizing signal delay unit 66 delays the time required for the synchronizing signal Sa to arrive at the image capturing device controller 34 by another time corresponding to $\lambda/4$, the image capturing device 30 obtains a sampled amplitude S3 of the reflected light 18 at the phase of 180° of the modulated light 12. When the synchronizing signal delay unit 66 delays the time required for the synchronizing signal Sa to arrive at the image capturing device controller 34 by still another time corresponding to $\lambda/4$, the image capturing device 30 obtains a sampled amplitude S4 of the reflected light 18 at the phase of 270° of the modulated light 12.

A processing sequence of the first ranging apparatus 10A will be described below with reference to the waveform diagram shown in FIG. 6 and a flowchart shown in FIG. 7.

First, the synchronizing signal generator 24 generates a synchronizing signal Sa representing a first frame in step S101 shown in FIG. 7. Based on a negative-going-edge time t0 of the synchronizing signal Sa, the light emission controller 28 controls the light emitter 26 to emit a modulated light 12 in step S102.

The modulated light 12 emitted from the light emitter 26 is applied to the object 16, and the object 16 reflects it as a reflected light 18 to the image capturing device 30 through the optical system 32. The synchronizing signal delay unit 66 recognizes the synchronizing signal Sa representing the first frame as a first synchronizing signal Sa1, and outputs the first synchronizing signal Sa1 to the image capturing device controller 34 without delaying it in step S103. The image capturing device 30 is adjusted to have the center of the first exposure period Tr synchronized with a time point that is a time period Ta later than the negative-going-edge time t0 of the synchronizing signal Sa (Sa1) of the first frame, i.e., a time point at which the modulated light 12 has a phase of 0°. The image capturing device 30 is also adjusted such that the cycle length of successive exposure periods Tr thereof is equal to the wavelength $\lambda$ of the modulated light 12.

In the first frame, the amount of reflected light 18 at the time the phase of the modulated light 12 is 0° is photoelectrically converted into an electric charge, which is stored in the image capturing device 30 in step S104. Thereafter, the synchronizing signal generator 24 generates a synchronizing signal Sa representing a second frame in step S105. The synchronizing signal delay unit 66 recognizes the synchronizing signal Sa representing the second frame as a first synchronizing signal Sa1, and outputs the first synchronizing signal Sa1 to the image capturing device controller 34 without delaying it. In the second frame, the electric charge stored in the image capturing device 30 is transferred as an analog signal (image signal) in step S106, and the analog signal is converted into a digital signal in step S107. The digital signal is saved in the buffer memory 40 as first image data Dc1 representing a pixel-dependent array of sampled amplitudes S1 of the reflected light 18 at the time the phase of the modulated light 12 is 0° in step S108. Then, the light emitter 26 stops emitting the modulated light 12 in step S109.

Then, the synchronizing signal generator 24 generates a synchronizing signal Sa representing a third frame in step S110. The light emission controller 28 controls the light emitter 26 to emit a modulated light 12 from a negative-going-edge time t0 of the synchronizing signal Sa in step S111.

The modulated light 12 emitted from the light emitter 26 is applied to the object 16, and the object 16 reflects it as a reflected light 18 to the image capturing device 30 through the optical system 32. The synchronizing signal delay unit 66 recognizes the synchronizing signal Sa representing the third frame as a second synchronizing signal Sa2, and delays the second synchronizing signal Sa2 by the time $\lambda/4$ and outputs it to the image capturing device controller 34 in step S112. The image capturing device 30 is thus controlled to have the center of the first exposure period Tr synchronized with a time point that is delayed a time Ta+$\lambda/4$ from the negative-going-edge time t0 of the synchronizing signal Sa of the third frame, i.e., a time point at which the modulated light 12 has a phase of 90°. The image capturing device 30 is also controlled such that the cycle length of successive exposure periods Tr thereof is equal to the wavelength $\lambda$ of the modulated light 12. The time period from the negative-going-edge time of the synchronizing signal Sa of the third frame to the start time of the exposure period Tr is represented by Ta and is constant.

In the third frame, the amount of reflected light 18 at the time the phase of the modulated light 12 is 90° is photoelectrically converted into an electric charge, which is stored in the image capturing device 30 in step S113. Thereafter, the synchronizing signal generator 24 generates a synchronizing signal Sa representing a fourth frame in step S114. The synchronizing signal delay unit 66 recognizes the synchronizing signal Sa representing the fourth frame as a second synchronizing signal Sa2, and delays the second synchronizing signal Sa2 by the time $\lambda/4$ and outputs it to the image capturing device controller 34. In the fourth frame, the electric charge stored in the image capturing device 30 is transferred as an analog signal in step S115, and the analog signal is converted into a digital signal in step S116. The digital signal is saved in the buffer memory 40 as second image data Dc2 representing a pixel-dependent array of sampled amplitudes S2 of the reflected light 18 at the time the phase of the modulated light 12 is 90° in step S117. Then, the light emitter 26 stops emitting the modulated light 12 in step S118.

Then, the synchronizing signal generator 24 generates a synchronizing signal Sa representing a fifth frame in step S119. The light emission controller 28 controls the light emitter 26 to emit a modulated light 12 from a negative-going-edge time t0 of the synchronizing signal Sa in step S120.

The modulated light 12 emitted from the light emitter 26 is applied to the object 16, and the object 16 reflects it as a reflected light 18 to the image capturing device 30 through the optical system 32. The synchronizing signal delay unit 66 recognizes the synchronizing signal Sa representing the fifth frame as a third synchronizing signal Sa3, and delays the third synchronizing signal Sa3 by the time $(2\lambda)/4$ and outputs it to the image capturing device controller 34 in step S121. The image capturing device 30 is thus controlled to have the center of the first exposure period Tr synchronized with a time point that is delayed a time Ta+$(2\lambda)/4$ from the negative-going-edge time t0 of the synchronizing signal Sa of the fifth frame, i.e., a time point at which the modulated light 12 has a phase of 180°. The image capturing device 30 is also controlled such that the cycle length of successive exposure periods Tr thereof is equal to the wavelength $\lambda$ of the modulated light 12. The time period from the negative-going-edge time of the synchronizing signal Sa of the fifth frame to the start time of the exposure period Tr is represented by Ta and is constant.

In the fifth frame, the amount of reflected light 18 at the time the phase of the modulated light 12 is 180°, is photoelectrically converted into an electric charge, which is stored in the image capturing device 30 in step S122. Thereafter, the synchronizing signal generator 24 generates a synchronizing signal Sa representing a sixth frame in step S123. The synchronizing signal delay unit 66 recognizes the synchronizing signal Sa representing the sixth frame as a third synchronizing signal Sa3, and delays the third synchronizing signal Sa3 by the time (2λ)/4 and outputs it to the image capturing device controller 34. In the sixth frame, the electric charge stored in the image capturing device 30 is transferred as an analog signal in step S124, and the analog signal is converted into a digital signal in step S125. The digital signal is saved in the buffer memory 40 as third image data Dc3 representing a pixel-dependent array of sampled amplitudes S3 of the reflected light 18 at the time the phase of the modulated light 12 is 180° in step S126. Then, the light emitter 26 stops emitting the modulated light 12 in step S127.

Then, the synchronizing signal generator 24 generates a synchronizing signal Sa representing a seventh frame in step S128. The light emission controller 28 controls the light emitter 26 to emit a modulated light 12 from a negative-going-edge time t0 of the synchronizing signal Sa in step S129.

The modulated light 12 emitted from the light emitter 26 is applied to the object 16, and the object 16 reflects it as a reflected light 18 to the image capturing device 30 through the optical system 32. The synchronizing signal delay unit 66 recognizes the synchronizing signal Sa representing the seventh frame as a fourth synchronizing signal Sa4, and delays the fourth synchronizing signal Sa4 by the time (3λ)/4 and outputs it to the image capturing device controller 34 in step S130. The image capturing device 30 is thus controlled to have the center of the first exposure period Tr synchronized with a time point that is delayed a time Ta+(3λ)/4 from the negative-going-edge time t0 of the synchronizing signal Sa of the seventh frame, i.e., a time point at which the modulated light 12 has a phase of 270°. The image capturing device 30 is also controlled such that the cycle length of successive exposure periods Tr thereof is equal to the wavelength λ of the modulated light 12. The time period from the negative-going-edge time of the synchronizing signal Sa of the seventh frame to the start time of the exposure period Tr is represented by Ta and is constant.

In the seventh frame, the amount of reflected light 18 at the time the phase of the modulated light 12 is 270°, is photoelectrically converted into an electric charge, which is stored in the image capturing device 30 in step S131. Thereafter, the synchronizing signal generator 24 generates a synchronizing signal Sa representing an eighth frame in step S132. The synchronizing signal delay unit 66 recognizes the synchronizing signal Sa representing the eighth frame as a fourth synchronizing signal Sa4, and delays the fourth synchronizing signal Sa4 by the time (3λ)/4 and outputs it to the image capturing device controller 34. In the eighth frame, the electric charge stored in the image capturing device 30 is transferred as an analog signal in step S133, and the analog signal is converted into a digital signal in step S134. The digital signal is saved in the buffer memory 40 as fourth image data Dc4 representing a pixel-dependent array of sampled amplitudes S4 of the reflected light 18 at the time the phase of the modulated light 12 is 270° in step S135. Then, the light emitter 26 stops emitting the modulated light 12 in step S136.

Then, the distance calculator 58 calculates the distance up to the object 16 based on the first through fourth image data Dc1 through Dc4 saved in the buffer memory 40 in step S137.

As described above, the first ranging apparatus 10A changes the arrival time of the synchronizing signal Sa from the synchronizing signal generator 24 at the image capturing device controller 34 depending on the number of times that the synchronizing signal Sa is generated. It is not necessary to change the time period Ta from the timing of the synchronizing signal Sa input to the image capturing device controller 34 to the light detection start time, and the exposure periods Tr are established in a single pattern. Therefore, the circuit (image capturing device controller 34) for energizing the image capturing device 30 is relatively simple, and the first ranging apparatus 10A is less burdensome to the CPU incorporated therein.

A ranging apparatus 10B according to a second embodiment of the present invention (hereinafter referred to as "second ranging apparatus 10B") will be described below with reference to FIGS. 8 through 10.

Figure 8:
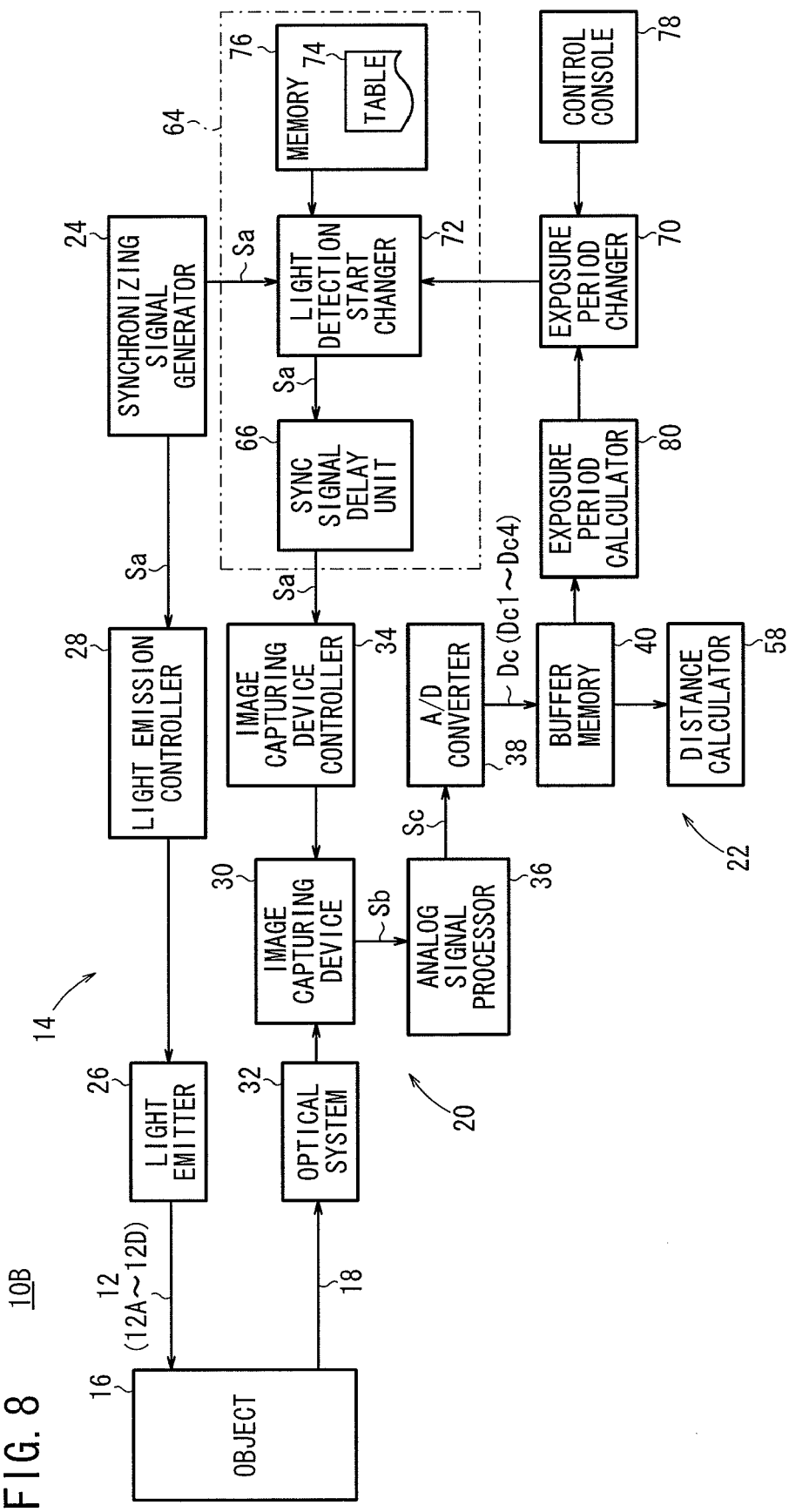
FIG. 8 is a block diagram of a second ranging apparatus according to the present invention.

As shown in FIG. 8, the second ranging apparatus 10B is similar to the first ranging apparatus 10A described above, but differs therefrom as follows:

The light-detecting unit 20 additionally includes an exposure period changer 70 for changing the durations (time lengths) of the exposure periods Tr based on an external control signal. The synchronizing signal control unit 64 includes, in addition to the synchronizing signal delay unit 66, a first light detection start changer 72 for changing the start timing of light detection by the image capturing device 30 based on the exposure periods Tr changed by the exposure period changer 70, and a memory 76 storing a first information table 74 which registers therein information of light detection start timings corresponding to the changed exposure periods Tr. The second ranging apparatus 10B changes light detection start timings by delaying the supplied synchronizing signal Sa by a time based on the changed exposure periods Tr. The first information table 74 stores delay times corresponding to the exposure periods Tr.

In the synchronizing signal control unit 64, the first light detection start changer 72 delays the synchronizing signal Sa from the synchronizing signal generator 24 based on the changed exposure periods Tr and the information in the first information table 74 stored in the memory 76, and then the synchronizing signal delay unit 66 delays the synchronizing signal Sa depending on the number of times that the synchronizing signal Sa is generated. Alternatively, the synchronizing signal delay unit 66 may first delay the synchronizing signal Sa, and then the first light detection start changer 72 may delay the synchronizing signal Sa.

The operating principles of the second ranging apparatus 10B will be described below with reference to FIGS. 6 and 9.

As shown in FIG. 6, initially, as with the first ranging apparatus 10A, the light emitter 26 emits a modulated light at a negative-going-edge time t0 of the synchronizing signal Sa.

The synchronizing signal delay unit 66 delays the arrival time of the synchronizing signal at the image capturing device controller in increments of λ/4 based on the number of generations of the synchronizing signal, and thus, the light-detecting unit 20 obtains sampled amplitudes of the reflected light 18 at the phases of 0°, 90°, 180°, 270°, for example, of the modulated light 12.

If the object 16 and its background are so bright that the signal generated by the light-detecting unit 20 is saturated, then the durations of the exposure periods Tr may be changed by a user's command input, an automatic iris mechanism, or an electronic shutter combined with the image capturing device 30. In other words, the durations of the exposure periods Tr may be changed based on an external control signal. In this case, the durations of the exposure periods Tr are usually changed while the central points of the exposure periods Tr remain unchanged in position. Therefore, the start times of the exposure periods Tr are changed, and hence the timings at which the drive signal is applied to the image capturing device 30 need to be changed, resulting in the need for a calibration.

In the second ranging apparatus 10B, the exposure period changer 70 changes the exposure periods Tr based on a command signal from a user control console 78, i.e., a command signal from the user indicating whether the exposure periods Tr are to be shorter or longer, or a command signal from an exposure period calculator 80, i.e., a command signal indicating whether the exposure periods Tr are to be shorter or longer, based on the sampled amplitudes stored in the buffer memory 40.

The exposure period changer 70 may change the exposure periods Tr as follows: The exposure period changer 70 establishes several types of exposure periods Tr having different time lengths, e.g., at least two types of exposure periods Tr, in advance. When a command signal for shortening the exposure periods Tr is applied to the exposure period changer 70, the exposure period changer 70 selects exposure periods Tr that are one level shorter than the present exposure periods Tr. When a command signal for lengthening the exposure periods Tr is applied to the exposure period changer 70, the exposure period changer 70 selects exposure periods Tr that are one level longer than the present exposure periods Tr.

In this manner, the exposure period changer 70 can easily change the exposure periods Tr.

If the exposure periods start at a time when the given period Ta has elapsed from the negative-going-edge time of the synchronizing signal, then the central time points of the exposure periods Tr which are not changed are shifted out of alignment with the central time points of the exposure periods Tr which have been changed. Therefore, the reflected light 18 cannot be sampled at the given four phases (180°, 90°, 0°, 270°) of the modulated light 12.

The above problem is solved as follows: The exposure period changer 70 assigns identification codes respectively to a plurality of types of exposure periods Tr that are established in advance. The exposure period changer 70 sends an identification code corresponding to the exposure periods Tr selected thereby to the first light detection start changer 72, which recognizes the changed exposure periods Tr based on the identification code.

The first light detection start changer 72 changes the light detection start timing based on the changed exposure periods Tr (selected exposure periods) and the information registered in the first information table 74 stored in the memory 76. Specifically, since the first light detection start changer 72 can recognize the changed exposure periods Tr based on the identification code sent from the exposure period changer 70, the information registered in the first information table 74 may include, as shown in FIG. 10, the identification codes of the exposure periods Tr and the first delay times of the synchronizing signal which correspond to the identification codes of the exposure periods Tr.

Figure 9:
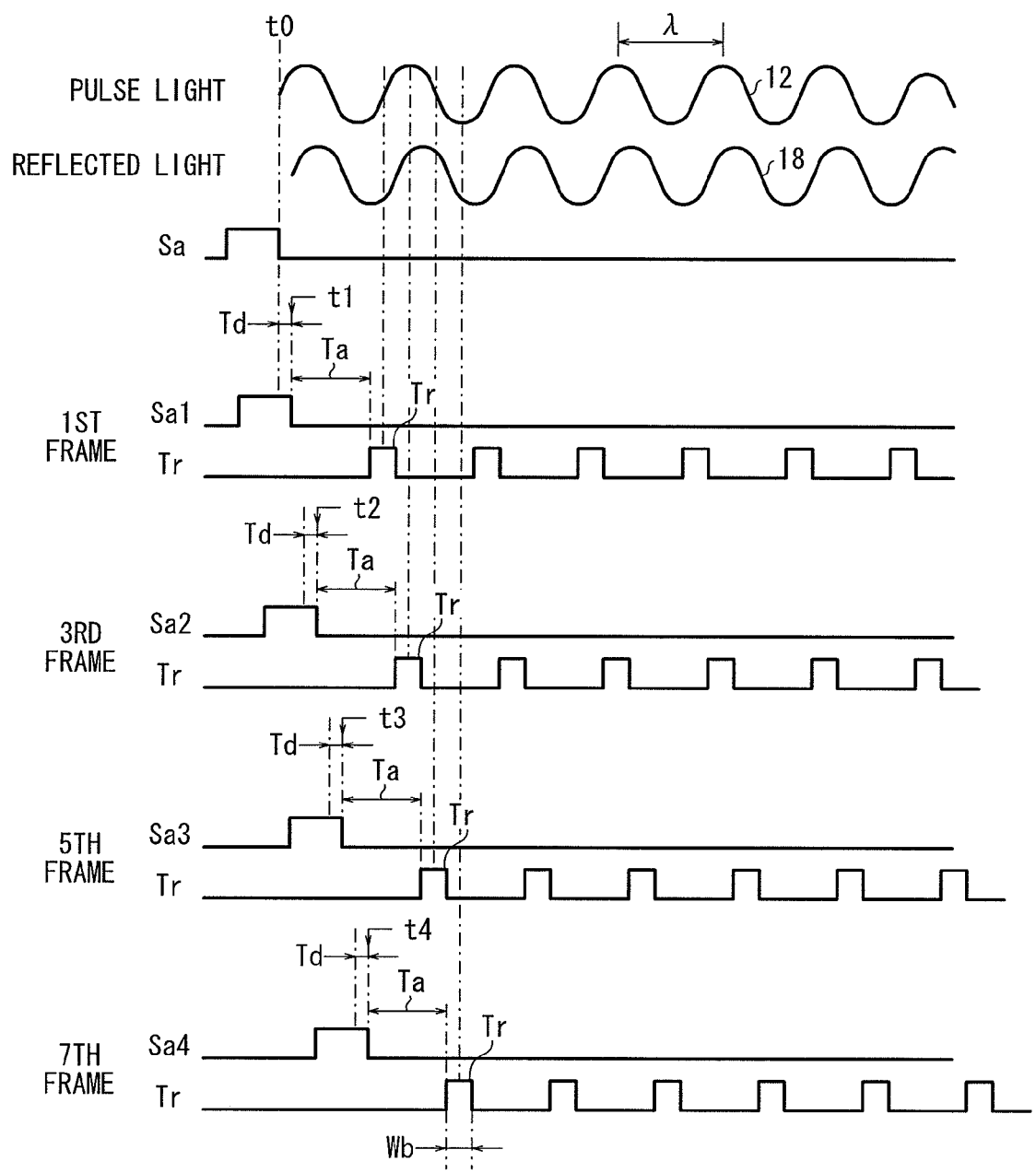
FIG. 9 is a waveform diagram showing the relationship between a modulated light, a synchronizing signal, and exposure periods whose duration has been changed.

Each of the first delay times is determined according to the following equation:

$$Td=(Wa-Wb)/2$$

where Wa represents an initial exposure period Tr (e.g., the exposure period Tr shown in FIG. 6) and Wb a changed exposure period Tr (e.g., the exposure period Tr shown in FIG. 9). Since the changed exposure period Wb is known in advance in association with an identification code, it is easy to obtain a first delay time Td corresponding to an identification code.

As shown in FIG. 9, the first light detection start changer 72 delays the synchronizing signal Sa representing the first frame by the first delay time Td and inputs the delayed synchronizing signal Sa to the image capturing device controller 34. Therefore, the changed exposure period Tr is started at a time point which is the given time Ta later than a negative-going-point time t1 of the synchronizing signal Sa, and the center of the exposure period Tr is synchronized with a time point at which the phase of the modulated light 12 is 0°. As a result, the sampled amplitude S1 of the reflected light 18 is obtained when the phase of the modulated light 12 is 0°.

The first light detection start changer 72 delays the synchronizing signal Sa representing the third frame by the first delay time Td. Further, the synchronizing signal delay unit 66 delays the synchronizing signal Sa by a time corresponding to $\lambda/4$ and inputs the delayed synchronizing signal Sa to the image capturing device controller 34. Therefore, the changed exposure period Tr is started at a time point which is the given time Ta later than a negative-going-point time t2 of the synchronizing signal Sa, and the center of the exposure period Tr is synchronized with a time point at which the phase of the modulated light 12 is 90°. As a result, the sampled amplitude S2 of the reflected light 18 is obtained when the phase of the modulated light 12 is 90°.

The first light detection start changer 72 delays the synchronizing signal Sa representing the fifth frame by the first delay time Td. Further, the synchronizing signal delay unit 66 delays the synchronizing signal Sa by a time corresponding to $(2\lambda)/4$ and inputs the delayed synchronizing signal Sa to the image capturing device controller 34. Therefore, the changed exposure period Tr is started at a time point which is the given time Ta later than a negative-going-point time t3 of the synchronizing signal Sa, and the center of the exposure period Tr is synchronized with a time point at which the phase of the modulated light 12 is 180°. As a result, the sampled amplitude S3 of the reflected light 18 is obtained when the phase of the modulated light 12 is 180°.

The first light detection start changer 72 delays the synchronizing signal Sa representing the seventh frame by the first delay time Td. Further, the synchronizing signal delay unit 66 delays the synchronizing signal Sa by a time corresponding to $(3\lambda)/4$ and inputs the delayed synchronizing signal Sa to the image capturing device controller 34. Therefore, the changed exposure period Tr is started at a time point which is the given time Ta later than a negative-going-point time t4 of the synchronizing signal Sa, and the center of the exposure period Tr is synchronized with a time point at which the phase of the modulated light 12 is 270°. As a result, the sampled amplitude S4 of the reflected light 18 is obtained when the phase of the modulated light 12 is 270°.

As described above, when the reflected light 18 is sampled at the central time points of the changed exposure periods Tr, it can be sampled at the given four phases (180°, 90°, 0°, 270°) of the modulated light 12. As with the first ranging apparatus 10A, therefore, the second ranging apparatus 10B has its distance calculator 58 capable of calculating the distance up to the object 16 with high accuracy.

In the second ranging apparatus 10B, the first light detection start changer 72 changes the start timing of light detection by the image capturing device 30 based on the exposure periods Tr changed by the exposure period changer 70. Therefore, it is not necessary to change the time period (the given period Ta) from the negative-going-edge time of the synchronizing signal Sa to the start time of the exposure period Tr. As the relative time of the exposure periods Tr with respect to the synchronizing signal Sa remains unchanged, the second ranging apparatus 10B requires no calibration.

The second ranging apparatus 10B employs the first information table 74 registering therein the information of the delay times Td corresponding to the identification codes of the exposure periods Tr. The light detection start timings corresponding to the changed exposure periods Tr are changed based on the information registered in the first information table 74. Consequently, the light detection start timing based on the changed exposure periods Tr can be determined simply by accessing the first information table 74, rather than by carrying out complex calculations. The processing time required by the second ranging apparatus 10B is thus shortened.

A ranging apparatus 10C according to a third embodiment of the present invention (hereinafter referred to as "third ranging apparatus 10C") will be described below with reference to FIG. 11.

Figure 11:
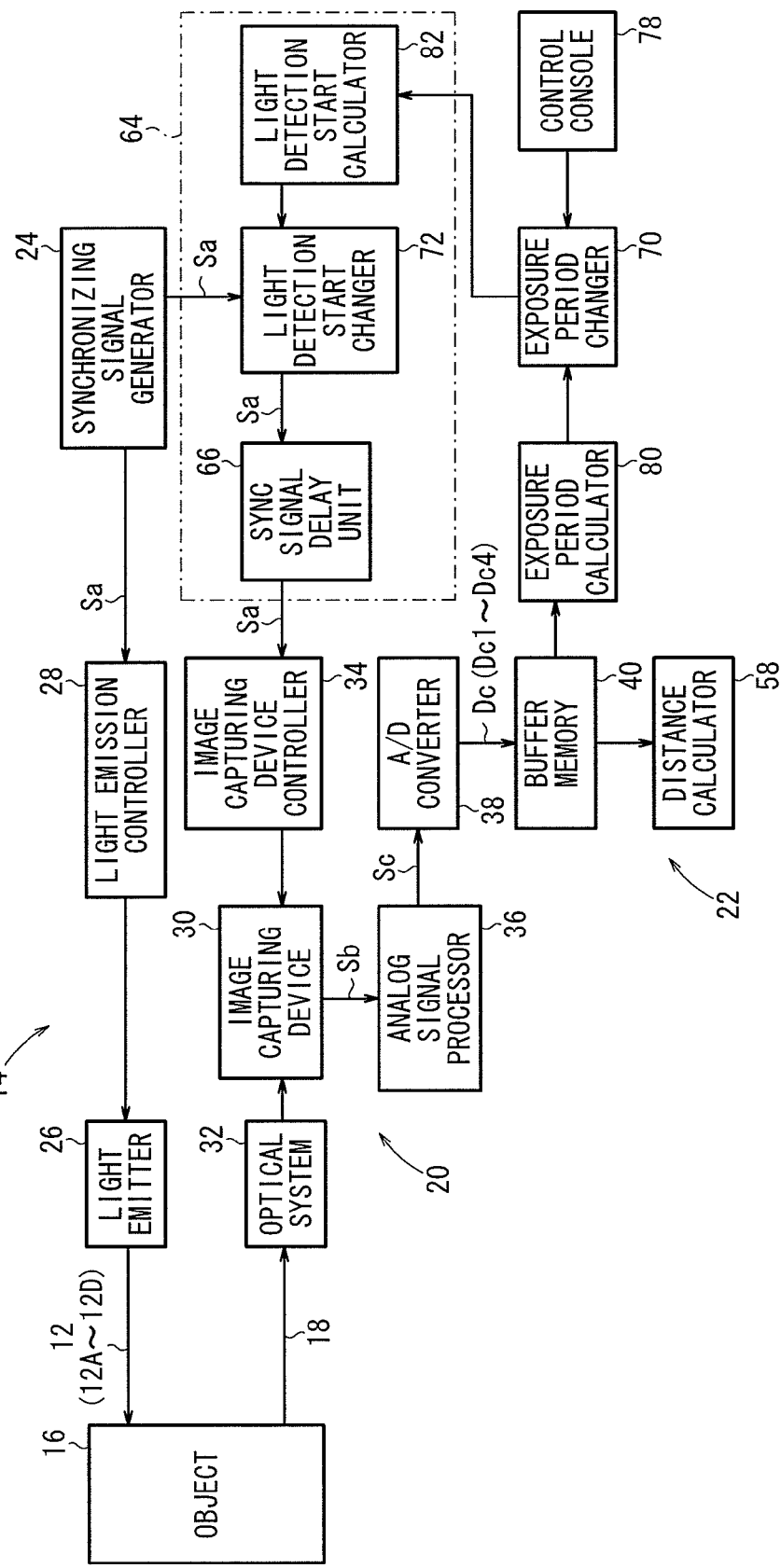
FIG. 11 is a block diagram of a third ranging apparatus according to the present invention.

As shown in FIG. 11, the third ranging apparatus 10C is similar to the second ranging apparatus 10B described above, except as follows:

The exposure period changer 70 has initial exposure periods Tr preset therein. When a command signal for shortening the exposure periods Tr is supplied to the exposure period changer 70, the exposure period changer 70 shortens the present exposure periods Tr by 1/n (n: real number). When a command signal for lengthening the exposure periods Tr is supplied to the exposure period changer 70, the exposure period changer 70 lengthens the present exposure periods Tr by 1/n (n: real number).

The third ranging apparatus 10C includes a first light detection start calculator 82 for calculating the delay time Td based on the changed exposure periods Tr, instead of the above-mentioned memory 76.

The first light detection start calculator 82 calculates the first delay time Td based on the durations of the changed exposure periods Tr according to the equation shown above. The calculated first delay time Td is supplied to the first light detection start changer 72. The first light detection start changer 72 and the synchronizing signal delay unit 66 are identical to those in the second ranging apparatus 10B described above, and will not be described below.

As with the second ranging apparatus 10B, the third ranging apparatus 10C has the distance calculator 58 capable of calculating the distance up to the object 16 highly accurately, and requires no calibration. In particular, the third ranging apparatus 10C does not need to have the memory 76 or a memory area for storing the first information table 74.

A ranging apparatus 10D according to a fourth embodiment of the present invention (hereinafter referred to as "fourth ranging apparatus 10D") will be described below with reference to FIGS. 12 and 13.

Figure 12:
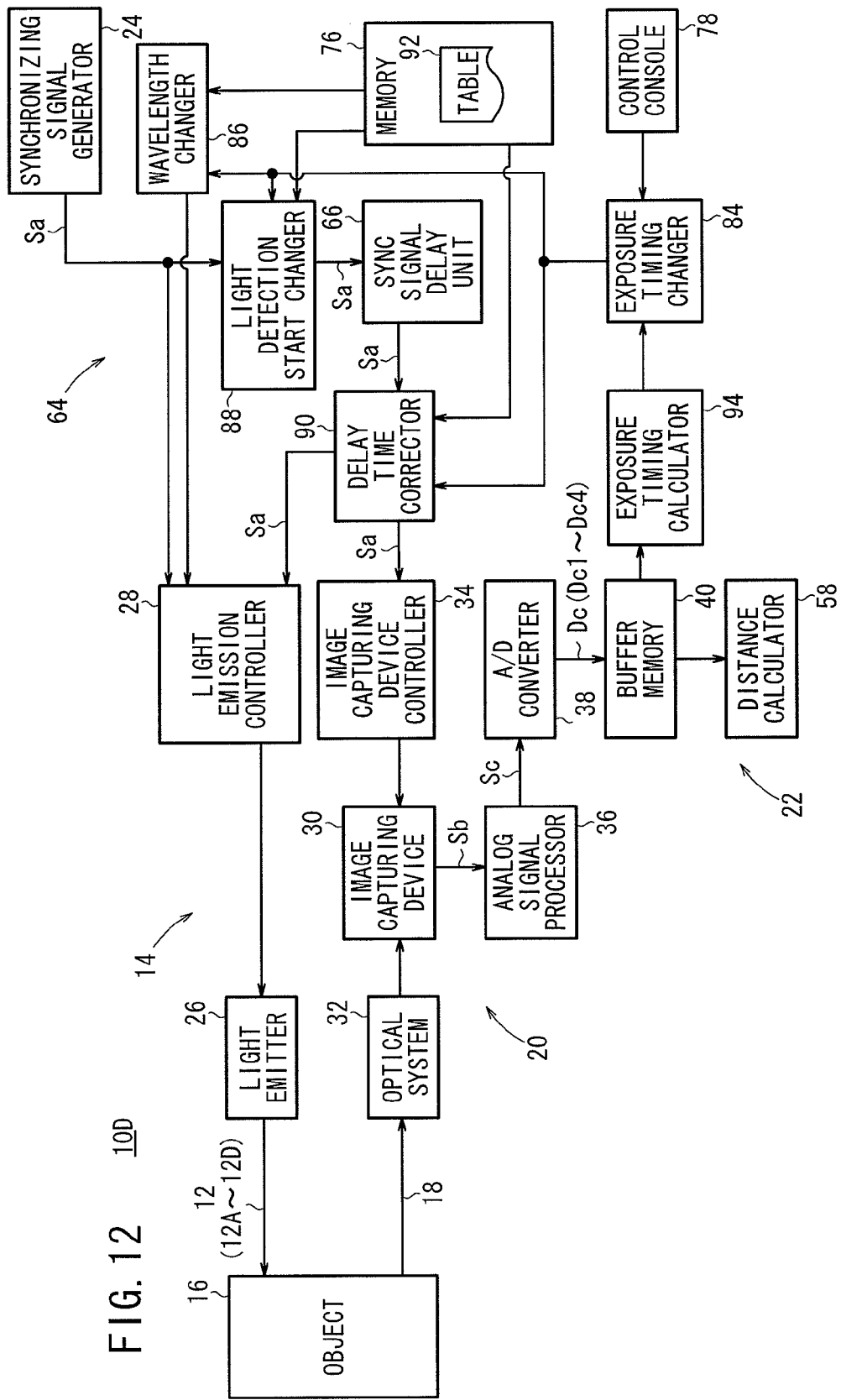
FIG. 12 is a block diagram of a fourth ranging apparatus according to the present invention.

As shown in FIG. 12, the fourth ranging apparatus 10D is similar to the first ranging apparatus 10A described above, but differs therefrom as follows:

The light-detecting unit 20 includes an exposure timing changer 84 for changing the cycle length Tt (see FIG. 13) of the exposure periods Tr based on an external control signal. The light-emitting unit 14 includes a wavelength changer 86 for changing the wavelengths $\lambda$ (see FIGS. 6 and 13) of the modulated light 12 based on the cycle length Tt of the exposure periods Tr changed by the exposure timing changer 84.

The synchronizing signal control unit 64 includes, in addition to the synchronizing signal delay unit 66, a second light detection start changer 88 for changing the light detection start timing based on the cycle length of the exposure periods Tr changed by the exposure timing changer 84, a delay time corrector 90 for correcting the delay time in the synchronizing signal delay unit 66 based on the changed cycle length of the exposure periods Tr, and a memory 76 storing a second information table 92 which registers therein information of the wavelength corresponding to the changed cycle length of the exposure periods Tr, light detection start timings, and corrective delay times. The fourth ranging apparatus 10D changes the light detection start timing by uniformly delaying the supplied synchronizing signal Sa by a second delay time Te based on the changed cycle length of the exposure periods Tr. The second information table 92 stores the information of the wavelength corresponding to the cycle length of the exposure periods Tr, the second delay time Te, and the corrective delay time Tf.

In the synchronizing signal control unit 64, the second light detection start changer 88 delays the synchronizing signal Sa from the synchronizing signal generator 24 based on the changed cycle length of the exposure periods Tr and the information registered in the second information table 92 stored in the memory 76. Further, the synchronizing signal delay unit 66 delays the synchronizing signal Sa depending on the number of times that the synchronizing signal Sa is generated. Then, the delay time corrector 90 delays the synchronizing signal Sa based on the changed cycle length of the exposure periods Tr and the information registered in the second information table 92. The sequence in which the synchronizing signal Sa is delayed is optional.

The operating principles of the fourth ranging apparatus 10D will be described below with reference to FIGS. 6 and 13.

As shown in FIG. 6, initially, as with the first ranging apparatus 10A, the light emitter 26 emits a modulated light at a negative-going-edge time t0 of the synchronizing signal Sa.

The synchronizing signal delay unit 66 delays the arrival time of the synchronizing signal Sa at the image capturing device controller 34 in increments of $\lambda/4$ based on the number of times that the synchronizing signal Sa is generated, and thus, the light-detecting unit 20 obtains sampled amplitudes of the reflected light 18 at the phases of 0°, 90°, 180°, 270°, for example, of the modulated light 12.

If the distance up to the object 16 is so large that the calculated distance is of an invalid value, then the time length of one frame may be changed by a CPU control signal or a user's command input, thereby changing the wavelength $\lambda$ of the modulated light 12. In other words, the time length of one frame may be changed based on an external control signal. In this case, the central time points of the exposure periods Tr are usually determined depending on the changed time length of one frame. If the cycle length of the exposure periods Tr is changed to a value which is related to the preset cycle length Tt of the exposure periods Tr by an integral number, e.g., if the cycle length Tt of the exposure periods Tr is divided by an integer or multiplied by an integer, then the process is simple. However, if the cycle length Tt of the exposure periods Tr is changed to a value which is related to the preset cycle time Tt of the exposure periods Tr by a real number, then the fourth ranging apparatus 10D needs a dedicated calibration.

In the fourth ranging apparatus 10D, the wavelength changer 86 changes the wavelengths $\lambda$ of the modulated light 12 based on a command signal from a user control console 78, i.e., a command signal from the user indicating whether the time length of one frame is to be shorter or longer, or a command signal from an exposure timing calculator 94 for calculating whether the time length of one frame is to be shorter or longer based on the sampled amplitudes stored in the buffer memory 40, i.e., a command signal indicating whether the time length of one frame is to be shorter or longer.

Likewise, the exposure timing changer 84 changes the cycle length Tt of the exposure periods Tr based on a command signal from the user control console 78 or a command signal from the exposure timing calculator 94.

The exposure timing changer 84 may change the cycle length Tt of the exposure periods Tr as follows: The exposure timing changer 84 establishes several types of cycle lengths Tt having different time lengths, e.g., at least two types of cycle lengths Tt, in advance. When a command signal for shortening one frame is applied to the exposure timing changer 84, the exposure timing changer 84 selects a cycle length Tt that is one level shorter than the cycle length Tt of the present exposure periods Tr. When a command signal for lengthening one frame is applied to the exposure timing changer 84, the exposure timing changer 84 selects a cycle length Tt that is one level longer than the cycle length Tt of the present exposure periods Tr.

The wavelengths λ of the modulated light 12 can be set depending on the changed cycle length Tt of the exposure periods Tr according to the above process. The cycle length Tt of the exposure periods Tr can be changed to a value which is related to the preset cycle length Tt of the exposure periods Tr by an integral number, e.g., the cycle length Tt of the exposure periods Tr can be divided by an integer or multiplied by an integer. Accordingly, the circuit arrangement of the fourth ranging apparatus 10D is relatively simple.

If the cycle length Tt of the exposure periods Tr is changed to a value which is related to the preset cycle length Tt of the exposure periods Tr by an integral number, e.g., the cycle length Tt of the exposure periods Tr is divided by an integer or multiplied by an integer, then the reflected light 18 can be sampled at the given four phases (180°, 90°, 0°, 270°) of the modulated light 12 providing the wavelength λ of the modulated light 12 remains unchanged. However, when the wavelength λ of the modulated light 12 is changed, the reflected light 18 cannot be sampled at the given four phases (180°, 90°, 0°, 270°) of the modulated light 12.

The above problem is solved as follows: The exposure timing changer 84 assigns identification codes respectively to the cycle lengths Tt of a plurality of types of exposure periods Tr that are established in advance. The exposure timing changer 84 sends an identification code corresponding to the cycle length Tt of exposure periods Tr selected thereby to the wavelength changer 86, the second light detection start changer 88, and the delay time corrector 90, which recognize the changed cycle length Tt of the exposure periods Tr based on the identification code.

The wavelength changer 86 changes the wavelengths λ of the modulated light 12 based on the changed cycle length Tt of the exposure periods Tr (selected cycle length of the exposure periods) and the information registered in the second information table 92 stored in the memory 76. The second light detection start changer 88 changes the light detection start timing based on the changed cycle length Tt of the exposure periods Tr and the information registered in the second information table 92. The delay time corrector 90 corrects the delay time of the synchronizing signal Sa delayed by the synchronizing signal delay unit 66, based on the changed cycle length Tt of the exposure periods Tr and the information registered in the second information table 92.

Specifically, inasmuch as the changed cycle length Tt of the exposure periods Tr can be recognized from the identification code sent from the exposure timing changer 84, the information registered in the second information table 92 may include, as shown in FIG. 14, the identification codes of the cycle lengths Tt of the exposure periods Tr, information of the wavelength λ corresponding to the identification codes of the cycle lengths Tt of the exposure periods Tr, the second delay time Te of the synchronizing signal, and the corrective delay time Tf.

The second delay time Te is determined according to the following equation:

$$Te=(a-1)\lambda$$

where λ represents the wavelength of the modulated light 12 in the initial state and aλ the changed wavelength of the modulated light 12.

The corrective delay time Tf is determined according to the following equation:

$$Tf=(n-1)(a-1)\lambda/4$$

where n represents the number of times that the synchronizing signal Sa is generated as recognized by the delay time corrector 90.

The information of the corrective delay time Tf is stored as $(a-1)\lambda/4$ in the second information table 92, and the actual corrective delay time Tf is determined by multiplying the information of the corrective delay time Tf by (n−1) in the delay time corrector 90.

With respect to the number n of times, as with the synchronizing signal delay unit 66, since the delay time corrector 90 recognizes the synchronizing signal Sa of the first frame and the synchronizing signal Sa of the second frame as the first synchronizing signal Sa1, n=1 at this time. Similarly, since the delay time corrector 90 recognizes the synchronizing signal Sa of the third frame and the synchronizing signal Sa of the fourth frame as the second synchronizing signal Sa2, n=2 at this time. Since the delay time corrector 90 recognizes the synchronizing signal Sa of the fifth frame and the synchronizing signal Sa of the sixth frame as the third synchronizing signal Sa3, n=3 at this time. Since the delay time corrector 90 recognizes the synchronizing signal Sa of the seventh frame and the synchronizing signal Sa of the eighth frame as the fourth synchronizing signal Sa4, n=4 at this time.

As the wavelengths λ corresponding to the changed cycle lengths of the exposure periods Tr are known in association with the identification codes, the second delay times Te and the corrective delay times Tf which correspond to the identification codes can easily be obtained.

The wavelength changer 86 reads wavelength information corresponding to the changed cycle length Tt of the exposure periods Tr, from among the plural items of wavelength information registered in the second information table 92 stored in the memory 76, and supplies the read wavelength information to the light emission controller 28. Based on the supplied wavelength information, the light emission controller 28 changes the wavelength λ of the modulated light 12.

The second light detection start changer 88 reads the information of the second delay time Te corresponding to the changed cycle length Tt of the exposure periods Tr, from among the information of the plural second delay times Te registered in the second information table 92, and delays the synchronizing signal Sa by the second delay time Te.

The delay time corrector 90 reads the information of the corrective delay time Tf corresponding to the changed cycle length Tt of the exposure periods Tr, from among the information of the plural corrective delay times Tf registered in the second information table 92, and delays the synchronizing signal Sa by the corrective delay time Tf.

As described above, the synchronizing signal delay unit 66 delays the synchronizing signal Sa depending on the number of times that the synchronizing signal Sa is generated.

Figure 13:
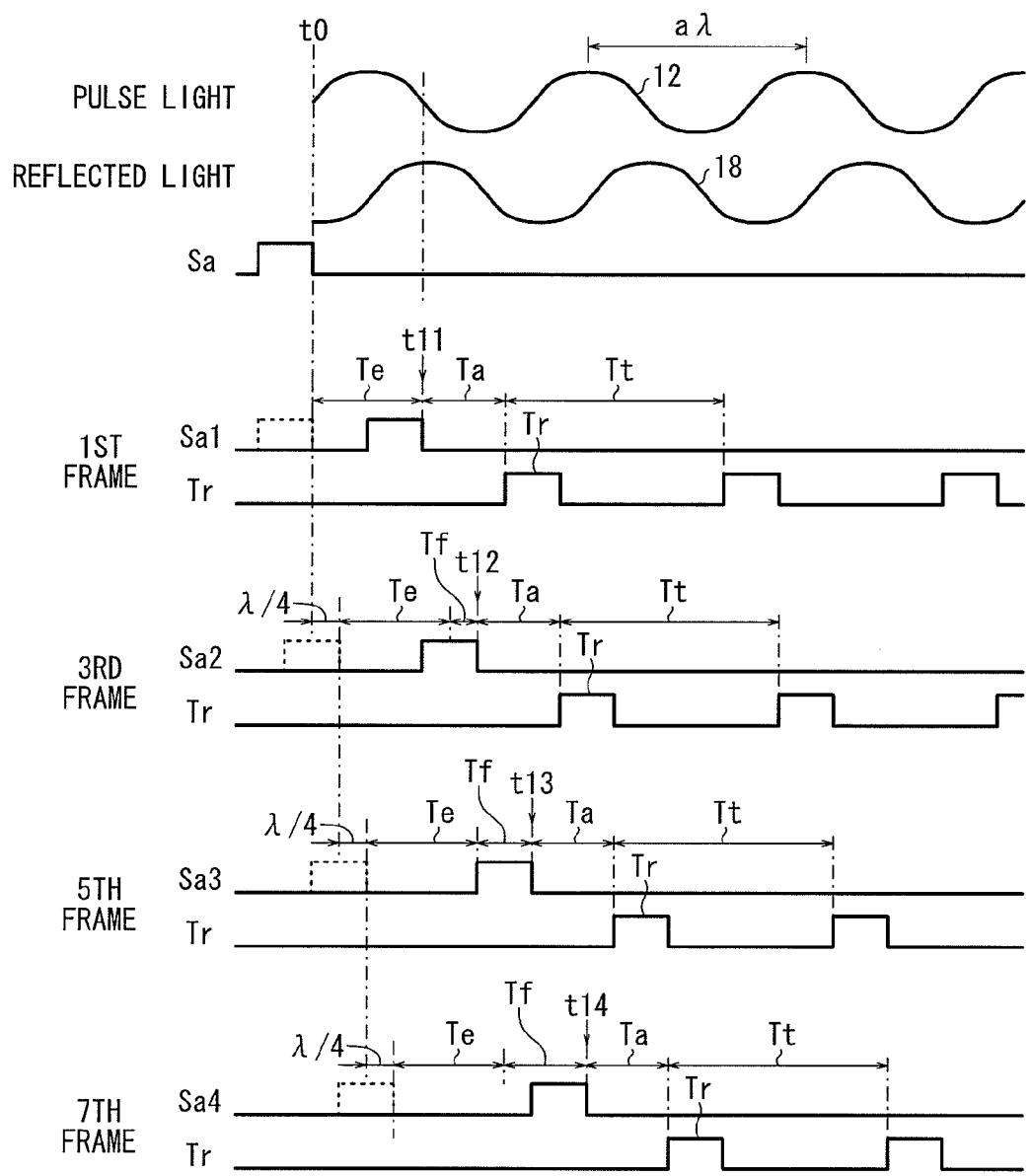
FIG. 13 is a waveform diagram showing the relationship between a modulated light, a reflected light, a synchronizing signal, and exposure periods whose duration (modulated light wavelength) has been changed.

As shown in FIG. 13, the modulated light 12 with the changed wavelength λ is emitted. Since the second light detection start changer 88 delays the synchronizing signal Sa of the first frame by the second delay time Te and supplies the delayed synchronizing signal Sa to the image capturing device controller 34. The exposure periods start at a time point which is the given time Ta later than a negative-going-edge time t11 of the synchronizing signal Sa1, and the centers of the exposure periods Tr are synchronized with a time point at which the modulated light 12 has a phase of 0°. As a result, the sampled amplitude S1 of the reflected light 18 is obtained when the phase of the modulated light 12 is 0°.

The second light detection start changer 88 delays the synchronizing signal Sa of the third frame by the second delay time Te (=(a−1)λ). The synchronizing signal delay unit 66 delays the synchronizing signal Sa by a time corresponding to λ/4. The delay time corrector 90 delays the synchronizing signal Sa by the corrective delay time Tf (=(a−1)λ/4), and supplies the delayed synchronizing signal Sa to the image capturing device controller 34. The changed exposure periods start at a time point which is the given time Ta later than a negative-going-edge time t12 of the synchronizing signal Sa2, and the centers of the exposure periods Tr are synchronized with a time point at which the modulated light 12 has a phase of 90°. As a result, the sampled amplitude S2 of the reflected light 18 is obtained when the phase of the modulated light 12 is 90°.

The second light detection start changer 88 delays the synchronizing signal Sa of the fifth frame by the second delay time Te. The synchronizing signal delay unit 66 delays the synchronizing signal Sa by a time corresponding to (2λ)/4. The delay time corrector 90 delays the synchronizing signal Sa by the corrective delay time Tf (=2(a−1)λ/4), and supplies the delayed synchronizing signal Sa to the image capturing device controller 34. The changed exposure periods start at a time point which is the given time Ta later than a negative-going-edge time t13 of the synchronizing signal Sa3, and the centers of the exposure periods Tr are synchronized with a time point at which the modulated light 12 has a phase of 180°. As a result, the sampled amplitude S3 of the reflected light 18 is obtained when the phase of the modulated light 12 is 180°.

The second light detection start changer 88 delays the synchronizing signal Sa of the seventh frame by the second delay time Te. The synchronizing signal delay unit 66 delays the synchronizing signal Sa by a time corresponding to (3λ)/4. The delay time corrector 90 delays the synchronizing signal Sa by the corrective delay time Tf (=3(a−1)λ/4), and supplies the delayed synchronizing signal Sa to the image capturing device controller 34. The changed exposure periods start at a time point which is the given time Ta later than a negative-going-edge time t14 of the synchronizing signal Sa4, and the centers of the exposure periods Tr are synchronized with a time point at which the modulated light 12 has a phase of 270°. As a result, the sampled amplitude S4 of the reflected light 18 is obtained when the phase of the modulated light 12 is 270°.

As described above, when the reflected light 18 is sampled at the central time points of the exposure periods Tr after their cycle lengths have been changed, it can be sampled at the given four phases (180°, 90°, 0°, 270°) of the modulated light 12. As with the second ranging apparatus 10B, therefore, the fourth ranging apparatus 10D has its distance calculator 58 capable of calculating the distance up to the object 16 with high accuracy.

In the fourth ranging apparatus 10D, the exposure timing changer 84 changes the cycle length Tt of the exposure periods Tr. The wavelength changer 86 changes the wavelength λ of the modulated light 12 based on the changed cycle length Tt of the exposure periods Tr. The second light detection start changer 88 changes the light detection start timing at the image capturing device 30 based on the changed cycle length Tt of the exposure periods Tr. The delay time corrector 90 corrects the delay time in the synchronizing signal delay unit 66. Therefore, the wavelength λ of the modulated light 12 can be set to match the cycle length Tt of the exposure periods Tr. As a result, the exposure timing can be changed to a value which is related to the preset cycle length Tt of the exposure periods Tr by an integral number, e.g., the cycle length Tt of the exposure periods Tr can be divided by an integer or multiplied by an integer. Accordingly, the circuit arrangement of the fourth ranging apparatus 10D is relatively simple.

The fourth ranging apparatus 10D employs the second information table 92 registering therein the information of the wavelengths of the modulated light 12 corresponding to the identification codes of the cycle times Tt of the exposure periods Tr, the light detection start timings, and the corrective delay times Tf. Based on the information registered in the second information table 92, the wavelength of the modulated light 12 and the light detection start timing are changed, and the delay time in the synchronizing signal delay unit 66 is corrected. Therefore, the wavelength of the modulated light 12, the light detection start timing, and the corrective delay time Tf based on the changed cycle length Tt of the exposure periods Tr can be determined simply by accessing the second information table 92, rather than by carrying out complex calculations. The processing time required by the fourth ranging apparatus 10D is thus shortened.

A ranging apparatus 10E according to a fifth embodiment of the present invention (hereinafter referred to as "fifth ranging apparatus 10E") will be described below with reference to FIG. 15.

Figure 15:
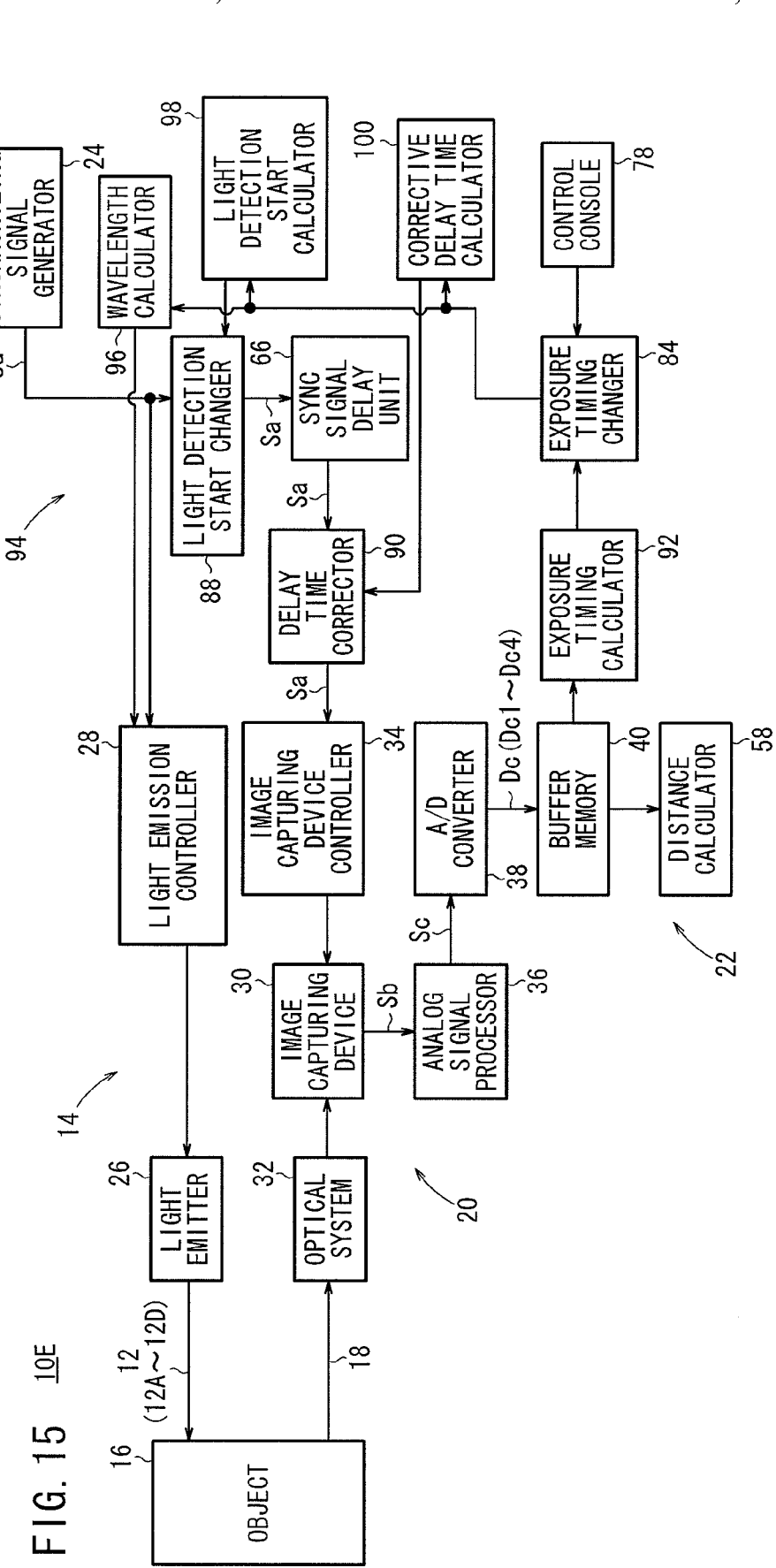
FIG. 15 is a block diagram of a fifth ranging apparatus according to the present invention.

As shown in FIG. 15, the fifth ranging apparatus 10E is similar to the fourth ranging apparatus 10D described above, but differs therefrom as follows:

The exposure timing changer 84 has the cycle length Tt of initial exposure periods Tr preset therein. When a command signal for shortening the cycle length Tt of the exposure periods Tr is supplied to the exposure timing changer 84, the exposure timing changer 84 shortens the cycle length Tt of the present exposure periods Tr by 1/m (m: integer). When a command signal for lengthening the cycle length Tt of the exposure periods Tr is supplied to the exposure timing changer 84, the exposure timing changer 84 lengthens the cycle length Tt of the present exposure periods Tr by 1/m (m: integer).

The fifth ranging apparatus 10E includes a wavelength calculator 96 for calculating the wavelength of the modulated light 12 based on the changed cycle length Tt of the exposure periods Tr, a second light detection start calculator 98 for calculating the light detection start timing by the image capturing device 30, and a corrective delay time calculator 100 for calculating the corrective delay time Tf for correcting the delay time in the synchronizing signal delay unit 66.

The wavelength calculator 96 calculates the wavelength of the modulated light 12 based on the changed cycle length Tt of the exposure periods Tr. The information of the calculated wavelength is supplied to the light emission controller 28. The second light detection start calculator 98 calculates the second delay time Te based on the changed cycle length Tt of the exposure periods Tr according to the equation shown above therefor. The calculated second delay time Te is supplied to the second light detection start changer 88. The corrective delay time calculator 100 calculates the corrective delay time Tf based on the changed cycle length Tt of the exposure periods Tr according to the equation shown above therefor. The calculated corrective delay time Tf is supplied to the delay time corrector 90. The second light detection start changer 88, the delay time corrector 90, and the synchronizing signal delay unit 66 are identical to those in the fourth ranging apparatus 10D described above, and will not be described below.

As with the fourth ranging apparatus 10D, the fifth ranging apparatus 10E has the distance calculator 58 capable of calculating the distance up to the object 16 highly accurately, and requires no calibration. In particular, the fifth ranging apparatus 10E does not need to have the memory 76 or a memory area for storing the second information table 92.

A ranging apparatus 10F according to a sixth embodiment of the present invention (hereinafter referred to as "sixth ranging apparatus 10F") will be described below with reference to FIG. 16.

Figure 16:
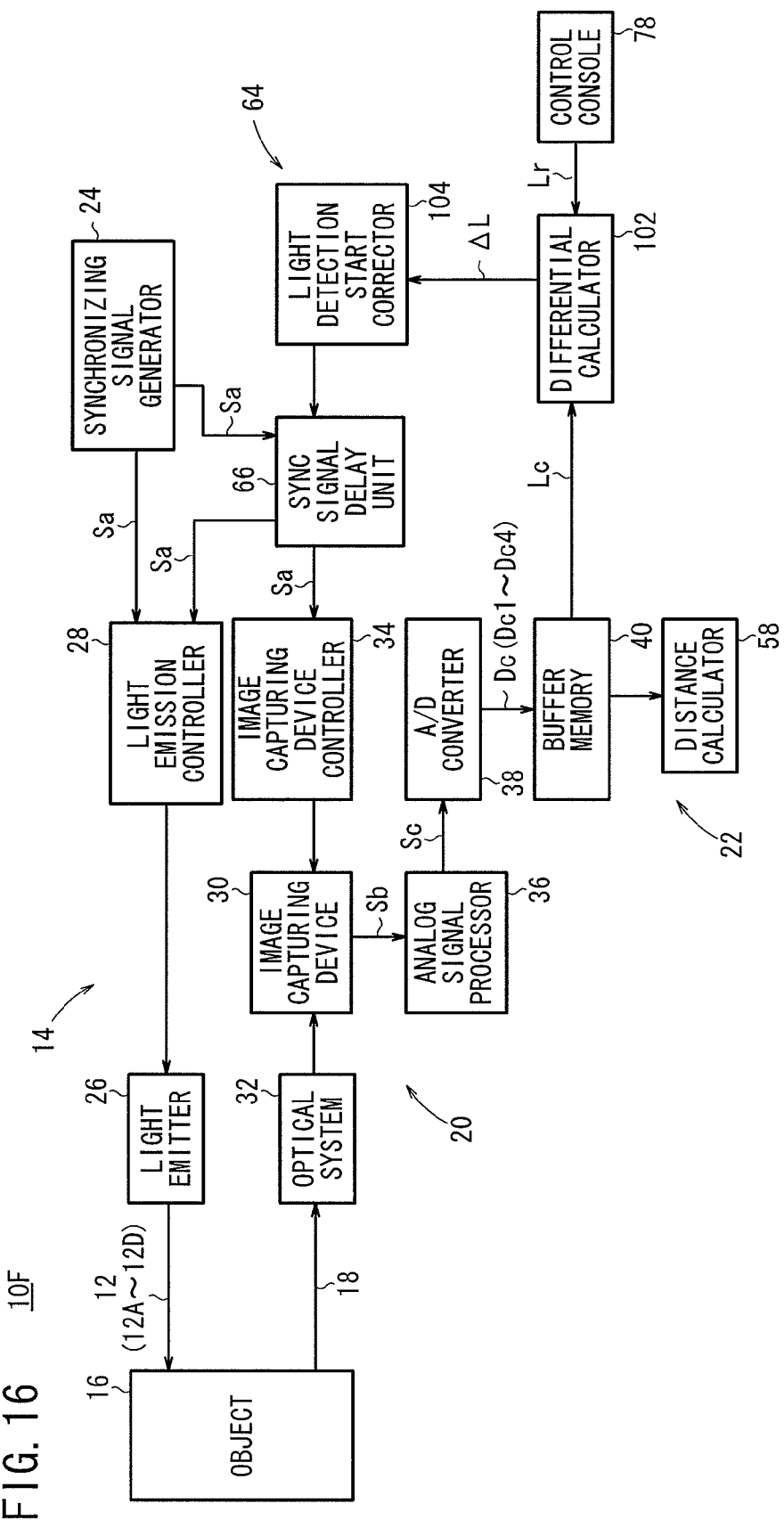
FIG. 16 is a block diagram of a sixth ranging apparatus according to the present invention.
Figure 17:
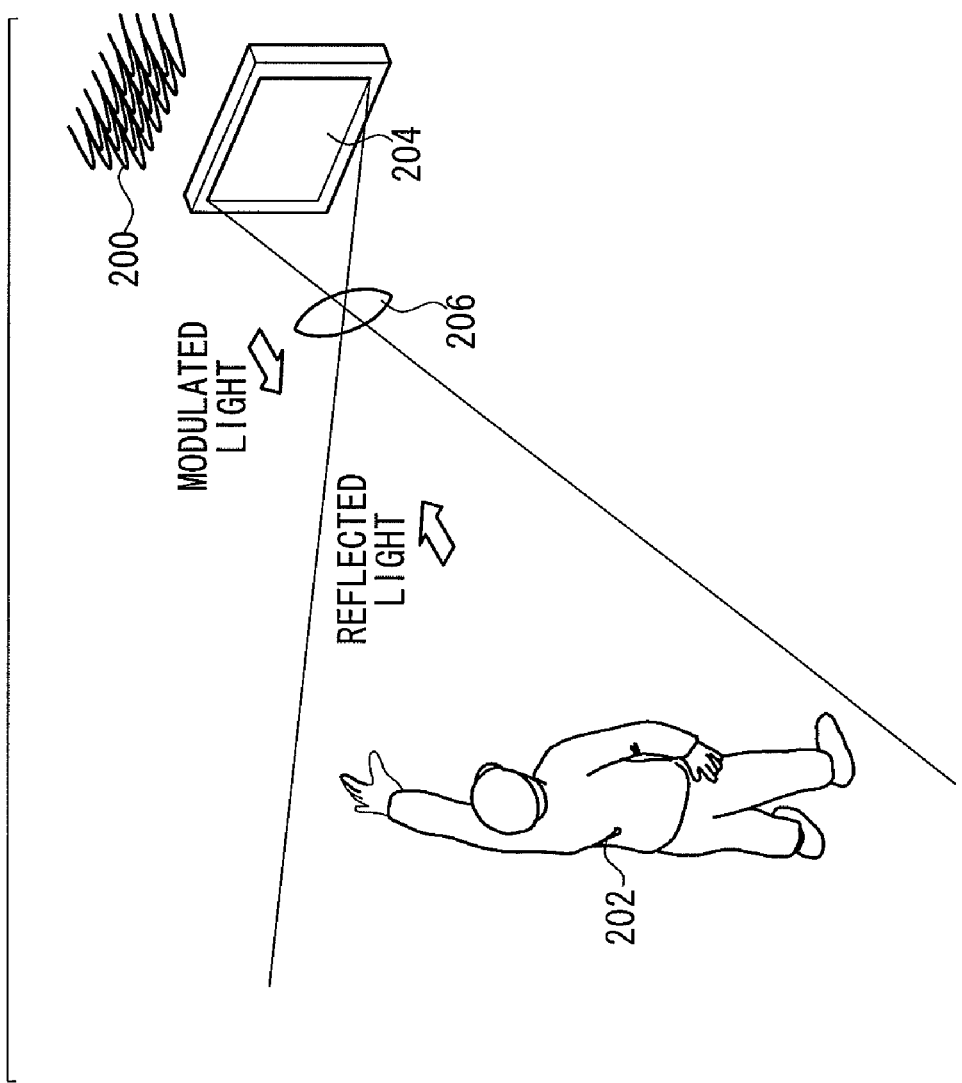
FIG. 17 is a view illustrative of an optical TOF ranging process.
Figure 18:
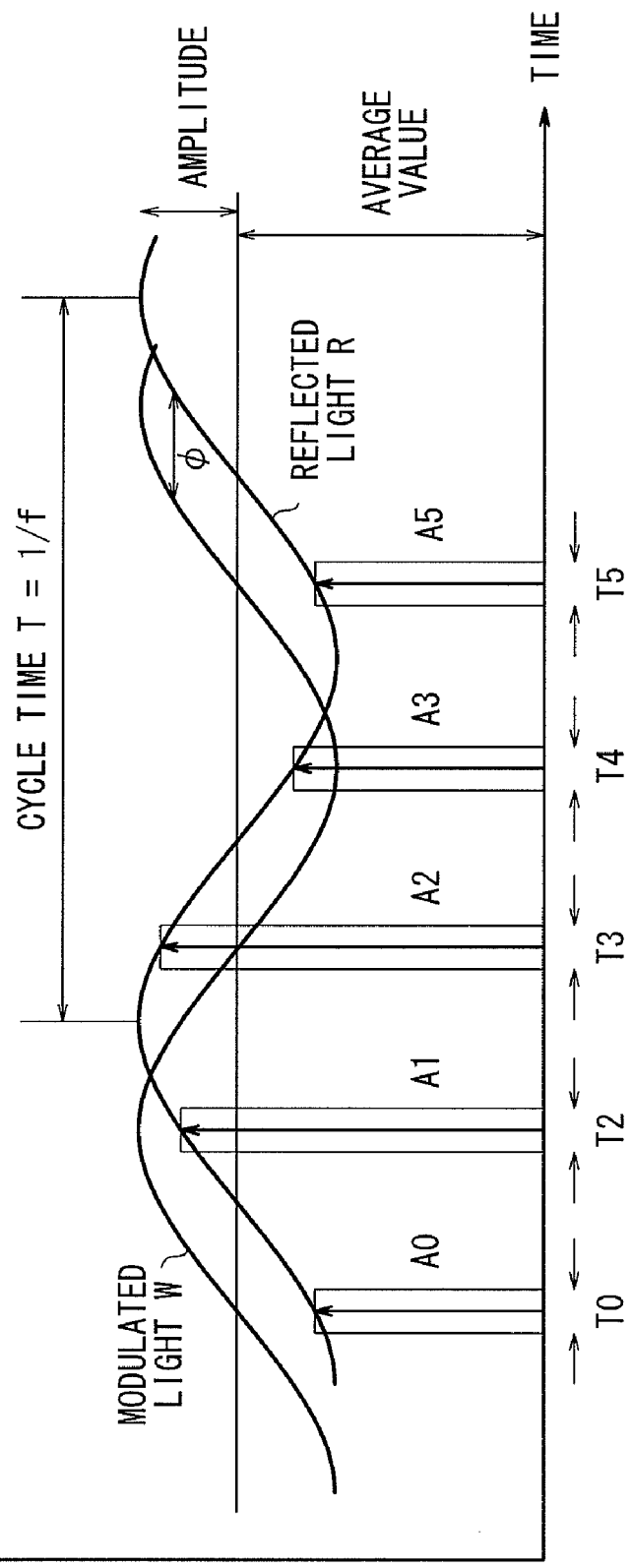
FIG. 18 is a waveform diagram showing a phase delay that a reflected light undergoes with respect to a modulated light.
Figure 19:
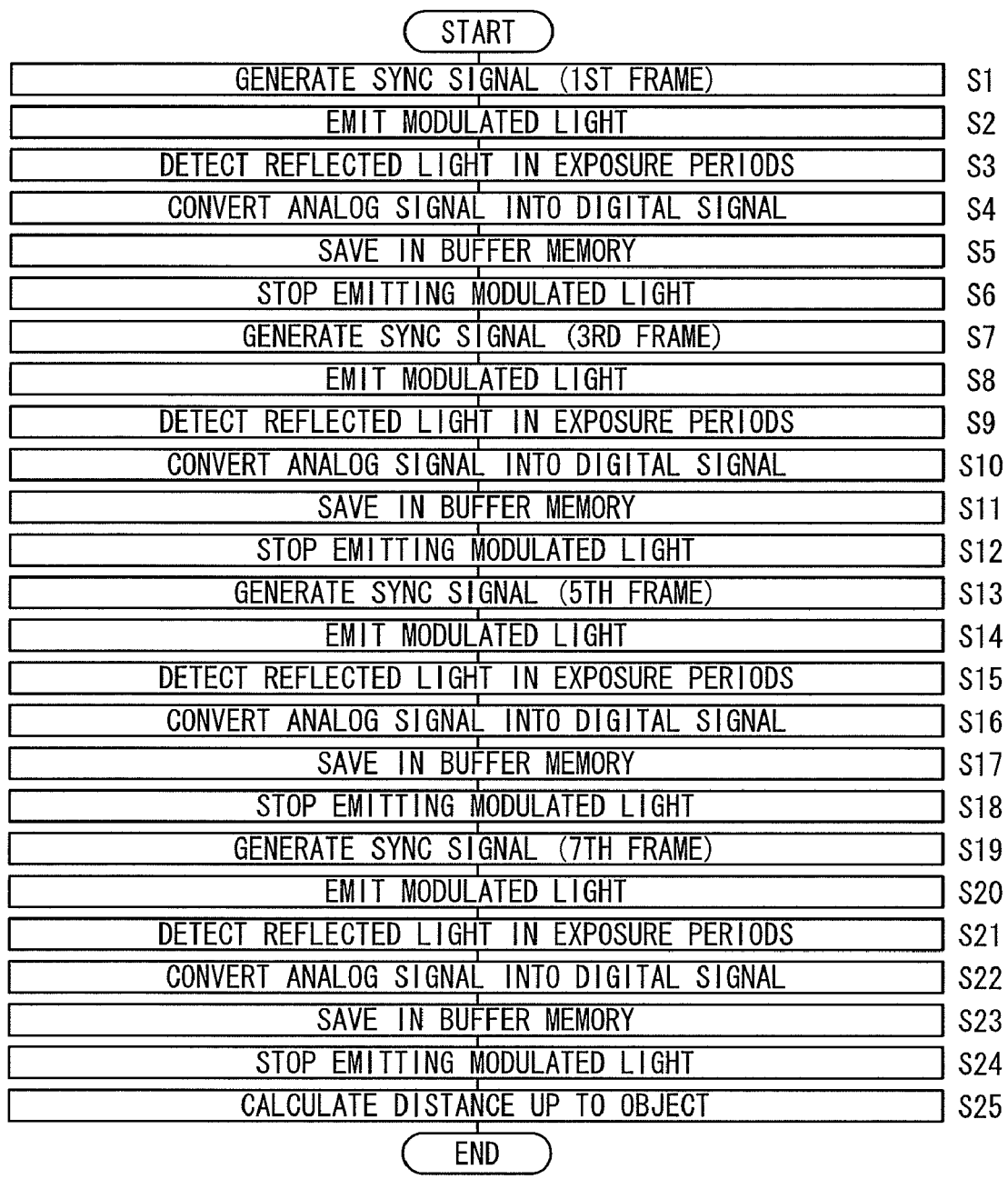
FIG. 19 is a flowchart of a processing sequence of a ranging apparatus according to the related art.
Figure 20A:
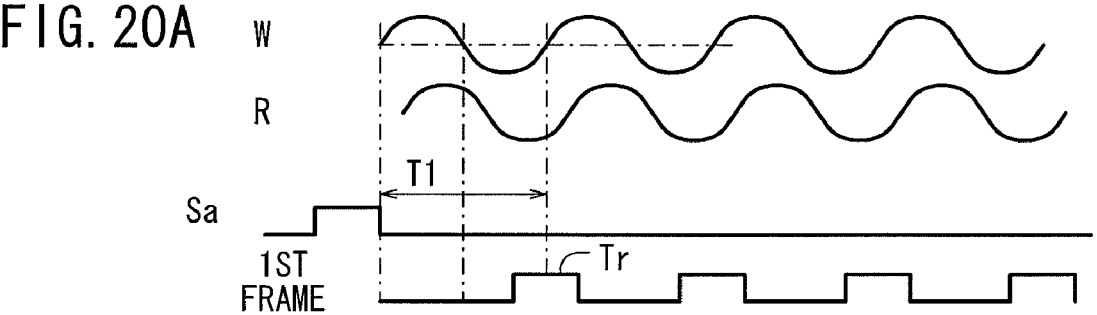
FIG. 20A is a waveform diagram showing the relationship between a modulated light, a reflected light, a synchronizing signal, and exposure periods in a first frame in the ranging apparatus according to the related art.
Figure 20B:
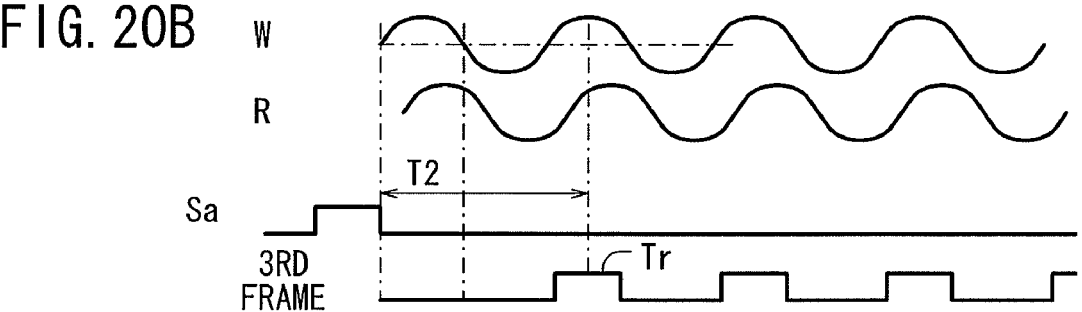
FIG. 20B is a waveform diagram showing the relationship between the modulated light, the reflected light, the synchronizing signal, and exposure periods in a third frame in the ranging apparatus according to the related art.
Figure 20C:
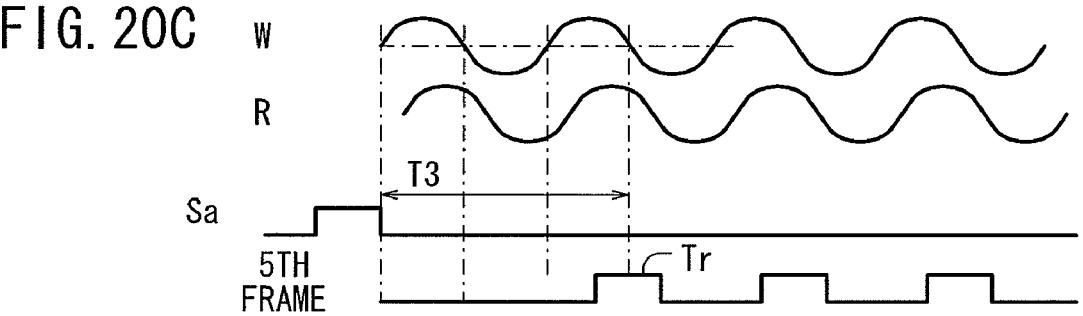
FIG. 20C is a waveform diagram showing the relationship between the modulated light, the reflected light, the synchronizing signal, and exposure periods in a fifth frame in the ranging apparatus according to the related art.
Figure 20D:
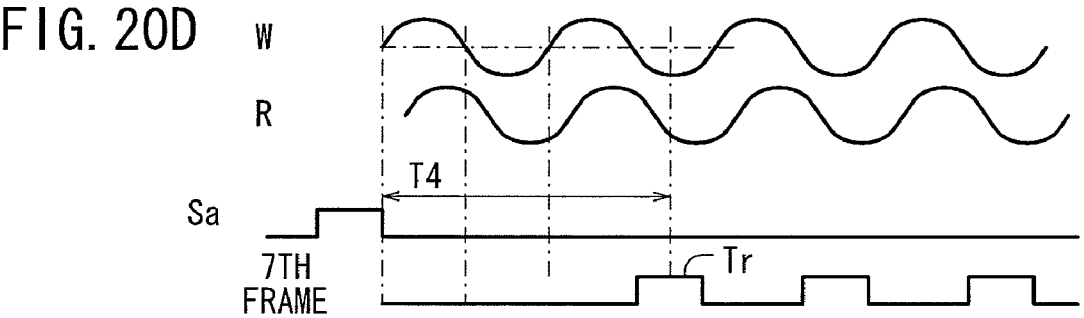
FIG. 20D is a waveform diagram showing the relationship between the modulated light, the reflected light, the synchronizing signal, and exposure periods in a seventh frame in the ranging apparatus according to the related.

As shown in FIG. 16, the sixth ranging apparatus 10F is similar to the first ranging apparatus 10A described above, but differs therefrom in that it includes a differential calculator 102 and a light detection start corrector 104.

The differential calculator 102 calculates the difference ΔL between the distance up to the object 16 which has been calculated by the distance calculator 58 (calculated distance Lc) and the measured distance Lr up to the object 16 which has been input from the control console 78.

The light detection start corrector 104 corrects the delay time for the synchronizing signal Sa in the synchronizing signal delay unit 66 based on the differential ΔL calculated by the differential calculator 102.

Specifically, the light detection start corrector 104 corrects a delay time (λ/4) to be added depending on the number of times that the synchronizing signal Sa is generated, based on the differential ΔL calculated by the differential calculator 102. If the distance up to the object 16 which has been calculated by the distance calculator 58 (calculated distance Lc) is shorter than the measured distance Lr up to the object 16 which has been input from the control console 78, then the light detection start corrector 104 sets the delay time to a value shorter (or longer) than the present set time. Conversely, if the calculated distance Lc is longer than the measured distance Lr, then the light detection start corrector 104 sets the delay time to a value longer (or shorter) than the present set time.

The distance calculator 58 calculates the distance up to the object 16 based on the corrected delay time and compares the calculated distance Lc with the measured distance Lr again.

If the calculated distance Lc and the measured distance Lr agree or substantially agree with each other, the operation of the differential calculator 102 and the light detection start corrector 104 is put to an end.

Since the sixth ranging apparatus 10F can correct an error of the distance measured up to the object 16, the sixth ranging apparatus 10F can measure the distance accurately and stably.

Although certain preferred embodiments of the present invention have been shown and described in detail, it should be understood that various changes and modifications may be made therein without departing from the scope of the appended claims.

What is claimed is:

1. A ranging apparatus comprising:
   a synchronizing signal generator for generating a synchronizing signal at a constant interval;
   a light-emitting unit for emitting a modulated light which is intensity-modulated, in response to said synchronizing signal input thereto;
   a light-detecting unit for detecting a reflected light from an object that is irradiated with said modulated light, in response to said synchronizing signal input thereto;
   a calculating unit for calculating the distance up to said object based on the phase difference between said modulated light and said reflected light; and
   a synchronizing signal control unit for changing an arrival time of said synchronizing signal from said synchronizing signal generator at said light-detecting unit, depending on the number of times that said synchronizing signal is generated;
   wherein said light-detecting unit samples an amount of the reflected light in exposure periods established at a constant cycle length with reference to a time at which said synchronizing signal is input thereto;
   wherein said light-detecting unit comprises an exposure period changer for changing time lengths of said exposure periods based on an external control signal; and
   wherein said synchronizing signal control unit changes the arrival time of said synchronizing signal from said synchronizing signal generator at said light-detecting unit, based on the number of times that said synchronizing signal is generated and the changed time lengths of said exposure periods.

2. A ranging apparatus according to claim 1, further comprising a memory storing a table which registers therein information of light detection start timings corresponding to the changed time lengths of said exposure periods;
   wherein said synchronizing signal control unit changes the arrival time of said synchronizing signal from said synchronizing signal generator at said light-detecting unit, based on the number of times that said synchronizing signal is generated and the information registered in said table.

3. A ranging apparatus according to claim 1, further comprising a timing calculator for calculating a light detection start timing based on the changed time lengths of said exposure periods;
   wherein said synchronizing signal control unit changes the arrival time of said synchronizing signal from said synchronizing signal generator at said light-detecting unit, based on the number of times that said synchronizing signal is generated and information of the light detection start timing calculated by said timing calculator.

4. A ranging apparatus according to claim 1, wherein said light-detecting unit includes an exposure timing changer for changing the cycle length of said exposure periods based on an external control signal;
   said light-emitting unit includes a wavelength changer for changing a wavelength of said modulated light based on the cycle length of said exposure periods which has been changed by said exposure timing changer; and
   said synchronizing signal control unit changes the arrival time of said synchronizing signal from said synchronizing signal generator at said light-detecting unit, based on the number of times that said synchronizing signal is generated and the changed cycle length of said exposure periods.

5. A ranging apparatus according to claim 4, further comprising a memory storing a table which registers therein information of the wavelength of said modulated light which corresponds to the changed cycle length of said exposure periods, and information of light detection start timings;
   wherein said wavelength changer changes the wavelength of said modulated light based on the information registered in said table; and wherein said synchronizing signal control unit changes the arrival time of said synchronizing signal from said synchronizing signal generator at said light-detecting unit, based on the number of times that said synchronizing signal is generated and the information registered in said table stored in said memory.

6. A ranging apparatus according to claim 4, further comprising:
a wavelength calculator for calculating a wavelength of said modulated light based on the changed cycle length of said exposure periods; and
a timing calculator for calculating a light detection start timing based on the changed cycle length of said exposure periods;
wherein said wavelength changer changes the wavelength of said modulated light to the wavelength calculated by said wavelength calculator; and
wherein said synchronizing signal control unit changes the arrival time of said synchronizing signal from said synchronizing signal generator at said light-detecting unit, based on the number of times that said synchronizing signal is generated and the light detection start timing calculated by said timing calculator.

7. A ranging apparatus according to claim 1, wherein said light-emitting unit emits a first modulated light over a predetermined period from a first emission start time based on the synchronizing signal input from said synchronizing signal generator, and emits a second modulated light over said predetermined period from a second emission start time based on the synchronizing signal input from said synchronizing signal generator;
said light-detecting unit detects a first reflected light from said object irradiated with said first modulated light over said predetermined period from said synchronizing signal input thereto which is output from said synchronizing signal control unit based on said first emission start time, and detects a second reflected light from said object irradiated with said second modulated light over said predetermined period from said synchronizing signal input thereto which is output from said synchronizing signal control unit based on said second emission start time; and
said calculating unit calculates the distance up to said object based on at least the phase difference between said first modulated light and said first reflected light and the phase difference between said second modulated light and said second reflected light.

8. A ranging apparatus according to claim 7, wherein said light-detecting unit samples the amount of the first reflected light in exposure periods established at a constant cycle length with reference to said synchronizing signal input thereto which is output from said synchronizing signal control unit based on said first emission start time, and samples the amount of the second reflected light in exposure periods established at said constant cycle length with reference to said synchronizing signal input thereto which is output from said synchronizing signal control unit based on said second emission start time; and
said calculating unit calculates a value representing the sampled amount of the first reflected light which is integrated over said predetermined period, as said phase difference between said first modulated light and said first reflected light, and calculates a value representing the sampled amount of the second reflected light which is integrated over said predetermined period, as said phase difference between said second modulated light and said second reflected light.

9. A ranging apparatus according to claim 1, further comprising a light detection start corrector for correcting said arrival time of said synchronizing signal from said synchronizing signal generator at said light-detecting unit, based on the difference between the distance up to said object which is calculated by said calculating unit and a distance measured up to said object.

10. A ranging method comprising the steps of:
(a) generating a synchronizing signal at a constant interval;
(b) emitting a modulated light which is intensity-modulated in response to said synchronizing signal which is input;
(c) delaying the generated synchronizing signal based on the number of times that the synchronizing signal is generated;
(d) detecting a reflected light from an object that is irradiated with said modulated light, in response to said synchronizing signal which is input; and
(e) calculating a distance up to said object based on a phase difference between said modulated light and said reflected light;
wherein said step (d) comprises the step of sampling an amount of the reflected light in exposure periods established at a constant cycle length with reference to a time at which said synchronizing signal is input
wherein said step (d) comprises the step of changing time lengths of said exposure periods based on an external control signal; and
wherein said step (c) comprises the step of delaying the generated synchronizing signal based on the number of times that said synchronizing signal is generated and the changed time lengths of said exposure periods.

11. A ranging method according to claim 10, wherein a table registering therein information of light detection start timings corresponding to the changed time lengths of said exposure periods is used; and
wherein said step (c) comprises the step of delaying the generated synchronizing signal based on the number of times that said synchronizing signal is generated and the information registered in said table.

12. A ranging method according to claim 10, further comprising the step of calculating a light detection start timing based on the changed time lengths of said exposure periods;
wherein said step (c) comprises the step of delaying the generated synchronizing signal based on the number of times that said synchronizing signal is generated and information of the calculated light detection start timing.

13. A ranging method according to claim 10, wherein said step (d) comprises the step of changing the cycle length of said exposure periods based on an external control signal;
said step (b) comprises the step of changing the wavelength of said modulated light based on the cycle length of said exposure periods which has been changed in said step of changing the cycle length; and
said step (c) comprises the step of delaying the generated synchronizing signal based on the number of times that said synchronizing signal is generated and the changed cycle length of said exposure periods.

14. A ranging method according to claim 13, wherein a table registering therein information of the wavelength of said modulated light which corresponds to the changed cycle length of said exposure periods, and information of light detection start timings is used;
said step of changing the wavelength comprises the step of changing the wavelength of said modulated light based on the information registered in said table; and said step (c) comprises the step of delaying the generated synchronizing signal based on the number of times that said synchronizing signal is generated and the information registered in said table.

15. A ranging method according to claim 13, further comprising the steps of:
calculating a wavelength of said modulated light based on the changed cycle length of said exposure periods; and
calculating a light detection start timing based on the changed cycle length of said exposure periods;
wherein said step of changing the wavelength comprises the step of changing the wavelength of said modulated light to the wavelength calculated in said step of calculating a wavelength; and
wherein said step (c) comprises the step of delaying the generated synchronizing signal based on the number of times that said synchronizing signal is generated and the light detection start timing calculated in said step of calculating a light detection start timing.

16. A ranging method according to claim 10, wherein said step (b) comprises the steps of:
emitting a first modulated light over a predetermined period from a first emission start time based on the generated synchronizing signal which is input, and emitting a second modulated light over the predetermined period from a second emission start time based on the generated synchronizing signal which is input;
wherein said step (d) comprises the steps of:
detecting a first reflected light from said object irradiated with said first modulated light over said predetermined period from said synchronizing signal input thereto which has been controlled in said step (c) based on said first emission start time, and detecting a second reflected light from said object irradiated with said second modulated light over said predetermined period from said synchronizing signal input thereto which has been controlled in said step (c) based on said second emission start time; and
wherein said step (e) comprises the step of calculating the distance up to said object based on at least the phase difference between said first modulated light and said first reflected light and the phase difference between said second modulated light and said second reflected light.

17. A ranging method according to claim 16, wherein said step (d) comprises the steps of:
sampling an amount of the first reflected light in exposure periods established at a constant cycle length with reference to said synchronizing signal input thereto which has been controlled in said step (c) based on said first emission start time, and sampling an amount of the second reflected light in exposure periods established at said constant cycle length with reference to said synchronizing signal input thereto which has been controlled in said step (c) based on said second emission start time; and
wherein said step (e) comprises the steps of:
calculating a value representing the sampled amount of the first reflected light which is integrated over said predetermined period, as said phase difference between said first modulated light and said first reflected light, and calculating a value representing the sampled amount of the second reflected light which is integrated over said predetermined period, as said phase difference between said second modulated light and said second reflected light.

18. A ranging method according to claim 10, further comprising the step of correcting a delay time for delaying said synchronizing signal in said step (c) based on a difference between the distance up to said object which is calculated in said step (e) and a distance measured up to said object.

19. A ranging apparatus comprising:
a synchronizing signal generator for generating a synchronizing signal at a constant interval;
a light-emitting unit for emitting a modulated light which is intensity-modulated, in response to said synchronizing signal input thereto;
a light-detecting unit for detecting a reflected light from an object that is irradiated with said modulated light, in response to said synchronizing signal input thereto;
a calculating unit for calculating the distance up to said object based on the phase difference between said modulated light and said reflected light; and
a synchronizing signal control unit for changing an arrival time of said synchronizing signal from said synchronizing signal generator at said light-detecting unit, depending on the number of times that said synchronizing signal is generated;
wherein said light-detecting unit samples an amount of the reflected light in exposure periods established at a constant cycle length with reference to a time at which said synchronizing signal is input thereto;
wherein said light-detecting unit includes an exposure timing changer for changing the cycle length of said exposure periods based on an external control signal;
said light-emitting unit includes a wavelength changer for changing a wavelength of said modulated light based on the cycle length of said exposure periods which has been changed by said exposure timing changer; and
said synchronizing signal control unit changes the arrival time of said synchronizing signal from said synchronizing signal generator at said light-detecting unit, based on the number of times that said synchronizing signal is generated and the changed cycle length of said exposure periods.

20. A ranging apparatus comprising:
a synchronizing signal generator for generating a synchronizing signal at a constant interval;
a light-emitting unit for emitting a modulated light which is intensity-modulated, in response to said synchronizing signal input thereto;
a light-detecting unit for detecting a reflected light from an object that is irradiated with said modulated light, in response to said synchronizing signal input thereto;
a calculating unit for calculating the distance up to said object based on the phase difference between said modulated light and said reflected light; and
a synchronizing signal control unit for changing an arrival time of said synchronizing signal from said synchronizing signal generator at said light-detecting unit, depending on the number of times that said synchronizing signal is generated;
wherein said light-emitting unit emits a first modulated light over a predetermined period from a first emission start time based on the synchronizing signal input from said synchronizing signal generator, and emits a second modulated light over said predetermined period from a second emission start time based on the synchronizing signal input from said synchronizing signal generator;
said light-detecting unit detects a first reflected light from said object irradiated with said first modulated light over said predetermined period from said synchronizing signal input thereto which is output from said synchronizing signal control unit based on said first emission start time, and detects a second reflected light from said object irradiated with said second modulated light over said predetermined period from said synchronizing signal input thereto which is output from said synchronizing signal control unit based on said second emission start time; and said calculating unit calculates the distance up to said object based on at least the phase difference between said first modulated light and said first reflected light and the phase difference between said second modulated light and said second reflected light.

21. A ranging method comprising the steps of:
   (a) generating a synchronizing signal at a constant interval;
   (b) emitting a modulated light which is intensity-modulated in response to said synchronizing signal which is input;
   (c) delaying the generated synchronizing signal based on the number of times that the synchronizing signal is generated;
   (d) detecting a reflected light from an object that is irradiated with said modulated light, in response to said synchronizing signal which is input; and
   (e) calculating a distance up to said object based on a phase difference between said modulated light and said reflected light;
   wherein said step (d) comprises the step of sampling an amount of the reflected light in exposure periods established at a constant cycle length with reference to a time at which said synchronizing signal is input;
   wherein said step (d) comprises the step of changing the cycle length of said exposure periods based on an external control signal;
   said step (b) comprises the step of changing the wavelength of said modulated light based on the cycle length of said exposure periods which has been changed in said step of changing the cycle length; and
   said step (c) comprises the step of delaying the generated synchronizing signal based on the number of times that said synchronizing signal is generated and the changed cycle length of said exposure periods.

22. A ranging method comprising the steps of:
   (a) generating a synchronizing signal at a constant interval;
   (b) emitting a modulated light which is intensity-modulated in response to said synchronizing signal which is input;
   (c) delaying the generated synchronizing signal based on the number of times that the synchronizing signal is generated;
   (d) detecting a reflected light from an object that is irradiated with said modulated light, in response to said synchronizing signal which is input; and
   (e) calculating a distance up to said object based on a phase difference between said modulated light and said reflected light;
   wherein said step (b) comprises the steps of:
   emitting a first modulated light over a predetermined period from a first emission start time based on the generated synchronizing signal which is input, and emitting a second modulated light over the predetermined period from a second emission start time based on the generated synchronizing signal which is input;
   wherein said step (d) comprises the steps of:
   detecting a first reflected light from said object irradiated with said first modulated light over said predetermined period from said synchronizing signal input thereto which has been controlled in said step (c) based on said first emission start time, and detecting a second reflected light from said object irradiated with said second modulated light over said predetermined period from said synchronizing signal input thereto which has been controlled in said step (c) based on said second emission start time; and
   wherein said step (e) comprises the step of calculating the distance up to said object based on at least the phase difference between said first modulated light and said first reflected light and the phase difference between said second modulated light and said second reflected light.

* * * * *